(12) United States Patent
Hatton et al.

(10) Patent No.: US 10,287,066 B2
(45) Date of Patent: May 14, 2019

(54) DISPENSING VALVE

(71) Applicant: AptarGroup, Inc., Crystal Lake, IL (US)

(72) Inventors: Jason D. Hatton, Essexville, MI (US); Greg L. Cole, Coleman, MI (US)

(73) Assignee: AptarGroup, Inc., Crystal Lake, IL (US)

( * ) Notice: Subject to any disclaimer, the term of this patent is extended or adjusted under 35 U.S.C. 154(b) by 731 days.

(21) Appl. No.: 14/371,003

(22) PCT Filed: Mar. 1, 2013

(86) PCT No.: PCT/US2013/028528
§ 371 (c)(1),
(2) Date: Jul. 8, 2014

(87) PCT Pub. No.: WO2013/138087
PCT Pub. Date: Sep. 19, 2013

(65) Prior Publication Data
US 2015/0014369 A1    Jan. 15, 2015

Related U.S. Application Data

(60) Provisional application No. 61/611,901, filed on Mar. 16, 2012.

(51) Int. Cl.
*B65D 47/04* (2006.01)
*F16K 15/14* (2006.01)
(Continued)

(52) U.S. Cl.
CPC .............. *B65D 47/04* (2013.01); *B29C 51/00* (2013.01); *B65D 47/2031* (2013.01);
(Continued)

(58) Field of Classification Search
CPC .... B65D 47/2031; B65D 47/04; B65D 47/20; B65D 35/52; F16K 24/04; F16K 15/147; B29C 51/00
(Continued)

(56) References Cited

U.S. PATENT DOCUMENTS 4,728,006 A    3/1988  Drobish
4,896,789 A *  1/1990  Federspiel ........... B65D 51/165
                                                        215/260
(Continued)

FOREIGN PATENT DOCUMENTS

DE    29508151 U1    8/1995
EP    0160336 A2 *  11/1985 ......... B65D 47/0838
(Continued)

OTHER PUBLICATIONS

The "International Search Report and Written Opinion of the International Searching Authority, or the Declaration" dated May 13, 2013 for the International Application No. PCT/US2013/028528 of which the above-captioned instant U.S. patent application Serial No. (not yet designated) is a U.S. national phase application.

*Primary Examiner* — Lien Ngo
(74) *Attorney, Agent, or Firm* — Woods, Phillips, Katz, Clark & Mortimer

(57) ABSTRACT

A slit valve (10) to selectively restrict the passage of a fluent substance between an interior environment (17) and an exterior environment (15) and a method for forming the valve (10), the method including the steps of providing at least one layer of film material and permanently deforming the film material to define a valve (10) for selectively restricting the passage of a fluent substance between an interior environment (17) and an exterior environment (15).

24 Claims, 28 Drawing Sheets

(51) Int. Cl.
  *B65D 75/58*  (2006.01)
  *B65D 47/20*  (2006.01)
  *F16K 21/04*  (2006.01)
  *B29C 51/00*  (2006.01)

(52) U.S. Cl.
  CPC ........ *B65D 75/5883* (2013.01); *F16K 15/147* (2013.01); *F16K 21/04* (2013.01); *Y10T 29/49405* (2015.01)

(58) Field of Classification Search
  USPC .............................. 222/490–496; 220/203.18
  See application file for complete search history.

(56) References Cited

U.S. PATENT DOCUMENTS

| | | | |
|---|---|---|---|
| 5,390,805 A * | 2/1995 | Bilani | B65D 1/32 137/845 |
| 5,743,443 A | 4/1998 | Hins | |
| 5,839,614 A | 11/1998 | Brown | |
| 6,315,483 B1 * | 11/2001 | Velliquette | A46B 11/0041 224/490 |
| 7,152,763 B2 * | 12/2006 | Stull | B29C 45/0081 222/212 |
| 7,681,750 B2 * | 3/2010 | Jackel | B65D 47/06 215/235 |
| 8,608,034 B2 * | 12/2013 | Bloom | B65D 47/2031 220/212 |
| 2002/0158083 A1 | 10/2002 | Brown et al. | |
| 2006/0006202 A1 | 1/2006 | Stull et al. | |
| 2006/0037975 A1 | 2/2006 | Suffa | |
| 2007/0114250 A1 * | 5/2007 | Langseder | B65D 47/0838 222/494 |
| 2007/0289651 A1 | 12/2007 | Brown et al. | |
| 2010/0244323 A1 | 9/2010 | Smith et al. | |
| 2011/0163134 A1 | 7/2011 | Bloom et al. | |

FOREIGN PATENT DOCUMENTS

| | | | | |
|---|---|---|---|---|
| EP | 0545678 | | 6/1993 | |
| EP | 0442379 B1 | | 1/1995 | |
| FR | 2786468 A1 | | 6/2000 | |
| GB | 2311061 A | | 9/1997 | |
| GB | 2331069 A | * | 5/1999 | ......... B65D 47/2031 |
| JP | 2005-160972 | * | 6/2005 | ............ B65D 47/20 |
| WO | 2009056792 A1 | | 5/2009 | |

* cited by examiner

DISPENSING VALVE

FIELD OF THE INVENTION

The present invention relates generally to valves and systems for selectively controlling the flow of a fluent substance, and more particularly relates to valves for selectively restricting the flow of a fluent substance between an interior environment and an exterior environment, such as, for example, valves for dispensing a product from a container or other source.

BACKGROUND OF THE INVENTION

One type of flexible, resilient valve is a self-closing, slit-type valve mounted by a fitment to a port of a fluent substance container or other source of fluent substance. Such valves have a slit or slits which define a normally closed orifice that opens to permit flow therethrough in response to an increased pressure differential across the valve (e.g., resulting from an increased pressure within the container when the container is squeezed, or from a reduced external ambient pressure compared to the pressure within the container). Such valves are typically designed so that they automatically close to shut off flow therethrough upon a reduction of the pressure differential across the valve.

Designs of such valves and of fitments using such valves are illustrated in the U.S. Pat. Nos. 5,271,732, 5,927,446, 5,942,712 and 6,545,901. Often, the fitment is in the form of a closure that includes a body or base mounted on the container neck to define a seat for receiving the valve and includes a retaining ring or other structure for holding the valve on the seat in the base. See, for example, U.S. Pat. Nos. 6,269,986 and 6,566,016. The valve is normally closed and can withstand the weight of the fluid product when the container is completely inverted so that the liquid will not leak out unless the container is squeezed. With such a system, the lid or cap need not be re-closed (although it is typically re-closed if the package is to be transported to another location, packed in a suitcase, etc.).

While such valves and valve systems have significant advantages and function well, there is always room for improvement.

SUMMARY OF THE INVENTION

In accordance with one feature of the invention, a slit valve is provided to selectively restrict the passage of a fluent substance between an interior environment and an exterior environment. The valve includes a flexible, resilient head, an annular, peripheral attachment portion, and an annular, flexible, resilient, intermediate portion. The head is centered on a central axis and extends laterally therefrom and has an interior surface to face an interior environment, an exterior surface to face an exterior environment, and confronting, openable portions to define a normally closed orifice in an unconstrained condition wherein the openable portions can move in a first direction to an open orifice configuration and return in an opposite direction to a closed configuration. The interior surface of the head is one of a convex surface or a concave surface, and the exterior surface of the head is one of a convex surface or a concave surface. The attachment portion is centered on the central axis and spaced laterally from the head. The intermediate portion is centered on the central axis and extends laterally from the head to the peripheral attachment portion. The intermediate portion has an interior surface to face the interior environment, and an exterior surface to face the exterior environment. The interior surface of the intermediate portion is one of a concave surface and a convex surface, and the exterior surface of the intermediate portion is one of a concave surface and a convex surface. The head and the intermediate portion are formed from a film of material that has undergone a permanent deformation to define the head and the intermediate portion.

In accordance with one feature, the interior surface of the head and the exterior surface of the intermediate portion are convex surfaces, and the exterior surface of the head and the interior surface of the intermediate portion are concave surfaces.

As one feature, the head has at least one self-sealing slit through the head, and the confronting openable portions extend along the at least one self-sealing slit.

In one feature, the uniform material thickness T is in the range of 0.001 to 0.010 inches.

According to one feature, the attachment portion has a planar interior surface spaced from a planar exterior surface by the uniform material thickness T.

In one feature, the attachment portion has an interior surface spaced from an exterior surface by a non-uniform material thickness that varies over the annular extent of the attachment portion. As a further feature, the exterior surface of the attachment portion defines a cylindrical wall that surrounds the head and the intermediate portion. In another further feature, the interior surface and the exterior surface of the attachment portion define a radially outwardly extending annular lip.

As one feature, the head and the intermediate portion have a uniform material thickness T spacing the exterior surfaces from the interior surfaces, with T being no greater than 0.020 inch.

According to one feature, the entire valve is defined by a permanently deformed film of material.

In one feature, the valve is combined with a fluent substance container having an opening through which fluent substance can pass between an interior of the container and the exterior environment, and a fitment sealingly mounted to the container, with the valve sealing mounted in the fitment to extend across the opening to restrict passage of a fluent substance between the interior of the container and the exterior environment at least when the openable portions are in the closed configuration.

In accordance with one feature of the invention, a method is provided for forming a slit valve to selectively restrict the passage of a fluent substance between an interior environment and an exterior environment. The method includes the steps of providing at least one layer of film material, and permanently deforming the film material to define a valve having a flexible, resilient head, an annular, peripheral attachment portion, and an annular, flexible, resilient, intermediate portion. The head is centered on a central axis and extends laterally therefrom, and has an interior surface to face an interior environment, and an exterior surface to face an exterior environment. The interior surface of the head is one of a convex surface or a concave surface, and the exterior surface of the head is one of a convex surface or a concave surface. The attachment portion is centered on the central axis and spaced laterally from the head. The intermediate portion is centered on the central axis and extends laterally from the head to the peripheral attachment portion, and has an interior surface to face the interior environment and an exterior surface to face the exterior environment. The interior surface of the intermediate portion is one of a concave surface and a convex surface, and the exterior surface of the intermediate portion is one of a concave surface and a convex surface.

As one feature, the step of permanently deforming provides the head and intermediate portion with a uniform material thickness T spacing the exterior surfaces from the interior surfaces, with T being no greater than 0.020 inch.

In one feature, the step of permanently deforming further includes defining the annular attachment portion to have the uniform material thickness T.

According to one feature, the step of permanently deforming further includes defining the annular attachment portion to have a planar exterior surface and a planar interior surface.

In one feature the uniform material thickness T is in the range of 0.001 to 0.010 inches.

As one feature, the method further includes the step of forming at least one self-sealing slit in the head and confronting, openable portions along the at least one slit in the head to define a normally closed orifice in an unconstrained condition wherein the openable portions can move in a first direction to an open orifice configuration and return in an opposite direction to a closed configuration.

According to one feature, the step of providing at least one layer of film material includes providing a plurality of layers of film material and the step of permanently deforming includes permanently deforming the plurality of layers to define the valve.

As one feature, the step of permanently deforming includes thermoforming the at least one layer of film to define the valve. In a further feature, the step of thermoforming includes matched die forming to define the valve.

In one feature, the step of providing the at least one layer of film includes injection molding a preformed component having the annular attachment portion and the at least one layer of film extending radially inwardly from the annular attachment portion.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, and in which like numerals are employed to designate like parts throughout the same.

DETAILED DESCRIPTION OF THE PREFERRED EMBODIMENT

Figure 1:
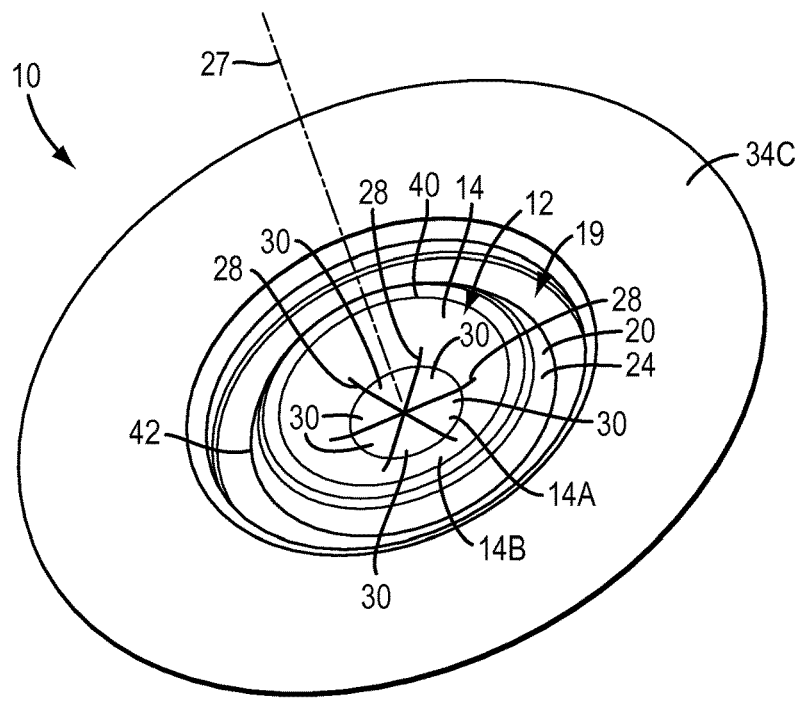
FIG. 1 is an enlarged isometric view from above of a valve embodying the present invention, with the valve shown in a closed condition.
Figure 2:
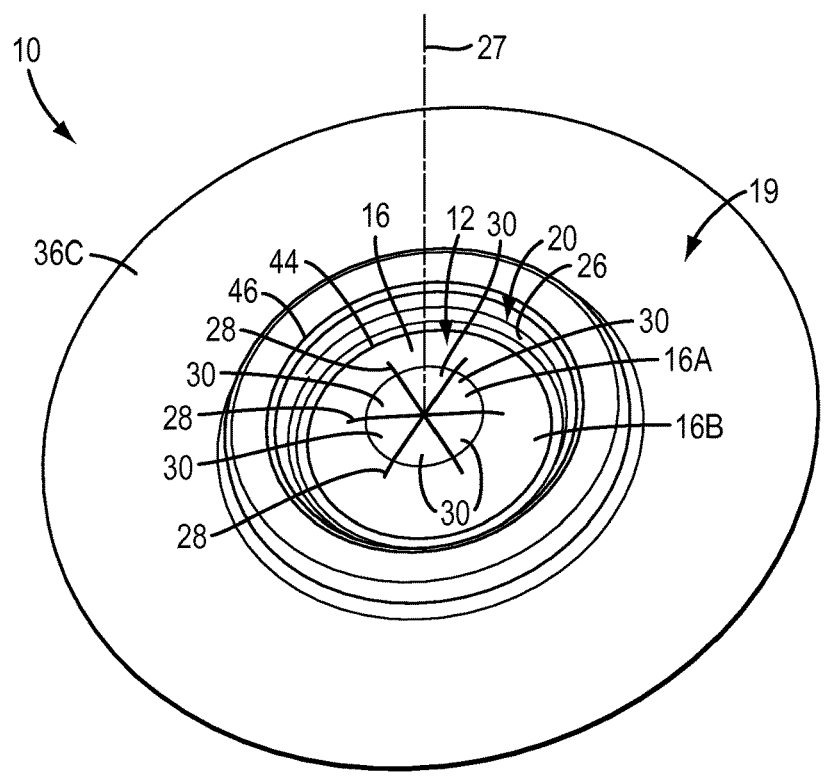
FIG. 2 is an enlarged isometric view from below of the valve of FIG. 1, again showing the valve in the closed condition.

While this invention is susceptible of embodiment in many different forms, this specification and the accompanying drawings disclose only one specific form as an example of the invention. The invention is not intended to be limited to the embodiment so described, however. The scope of the invention is pointed out in the appended claims.

For ease of description, the valve of this invention may be described, along with a fitment, in a typical (upright) position, and terms such as upper, lower, horizontal, etc., are used with reference to this position. It will be understood, however, that the valve embodying this invention may be manufactured, stored, transported, used, and sold in an orientation other than the position described.

Figures illustrating the valve of this invention and the associated fitments show some conventional mechanical elements that are known and that will be recognized by one skilled in the art. The detailed descriptions of such elements are not necessary to an understanding of the invention, and accordingly, are herein presented only to the degree necessary to facilitate an understanding of the novel features of the present invention.

A presently preferred embodiment of a valve according the invention is illustrated in FIGS. 1-17 and is designated generally by the number 10. The valve 10 includes a flexible, resilient central portion or head 12 having a first or exterior surface 14 facing an exterior environment (shown generally at 15 in FIGS. 4 and 8) and a second or interior surface 16 facing an interior environment (shown generally at 17 in FIGS. 4 and 8) in the illustrated and preferred embodiment. The valve 10 further includes a peripheral attachment portion or flange 19, and a flexible, resilient intermediate portion or sleeve 20 that extends laterally outwardly from the head 12 to the flange 19. Hereinafter, the term "sleeve" 20 is used in this specification, but in the claims the term "intermediate portion" 20 is used.

The valve 10 is a self-closing, slit-type valve and is preferably formed as a unitary structure from a film of material that is flexible, pliable, elastic, and resilient. As commonly understood in the art, and as used herein, the term "film" refers to a material that is planar (unconstrained condition) and having a thickness of 0.020 inch or less. For use in the present invention, the preferred materials can include linear low-density polyethylene (LLDPE), low density polyethylene (LDPE), LLDPE/LDPE blends, acetate, acetal, ultra-high-molecular-weight polyethylene (UHMW), polyester, urethane, ethylene-vinyl acetate (EVA), polypropylene, and high density polyethylene. Although less preferred, the material can also include other elastomers, such as a synthetic, thermosetting polymer, including silicone rubber, such as the silicone rubber sold by Dow Corning Corp. in the United States of America under the trade designations DC-99-525 and RBL-9525-54. The valve 10 can also be formed from other thermosetting materials or from other elastomeric materials, or from thermoplastic polymers or thermoplastic elastomers, including those based upon materials such as thermoplastic propylene, ethylene, and styrene, including their halogenated counterparts.

The valve 10 is preferably formed from a film of material that has undergone a permanent deformation to define at least the head 12 and the intermediate portion 20. In this regard, the film of material can be permanently deformed utilizing a suitable thermal forming process, which includes matched die forming, vacuum forming, plug assist forming, vacuum snap back forming, billow forming, free forming, pressure forming, drape forming, in-line thermal forming, twin sheet forming, and thin and thick gauge thermal forming, Other suitable processes include cast film extrusion, cold forming, in-mold labeling technology, in-mold assembling technologies, blow molding in a die set against a preform, roto forming, rotary "chip shot" molding, radio frequency (RF) forming, localized laser heating, etching processes to warp the film into a valve shape, and UV (ultraviolet) curing of a formed valve. In one highly preferred process for the valve 10 shown in FIGS. 1-17, the entire valve 10 is formed from a film of LLDPE/LDPE blend material that has been permanently deformed in a matched die forming process wherein the illustrated shapes of the head 12, the sleeve 20, and the radially inner portion of the peripheral attachment portion 19 are formed by permanently deforming the film of material, with the radially outer portion of the peripheral attachment portion 19 having the same planar configuration as the film material.

Figure 4:
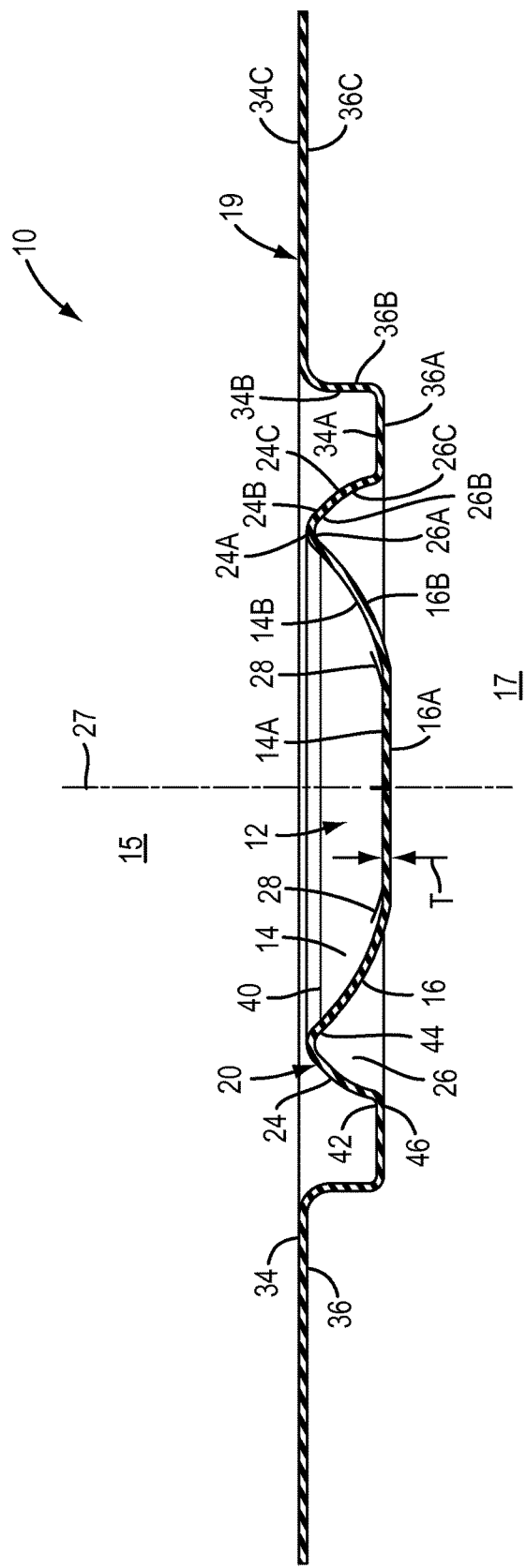
FIG. 4 is a section view taken from line 4-4 in FIG. 3.
Figure 5:
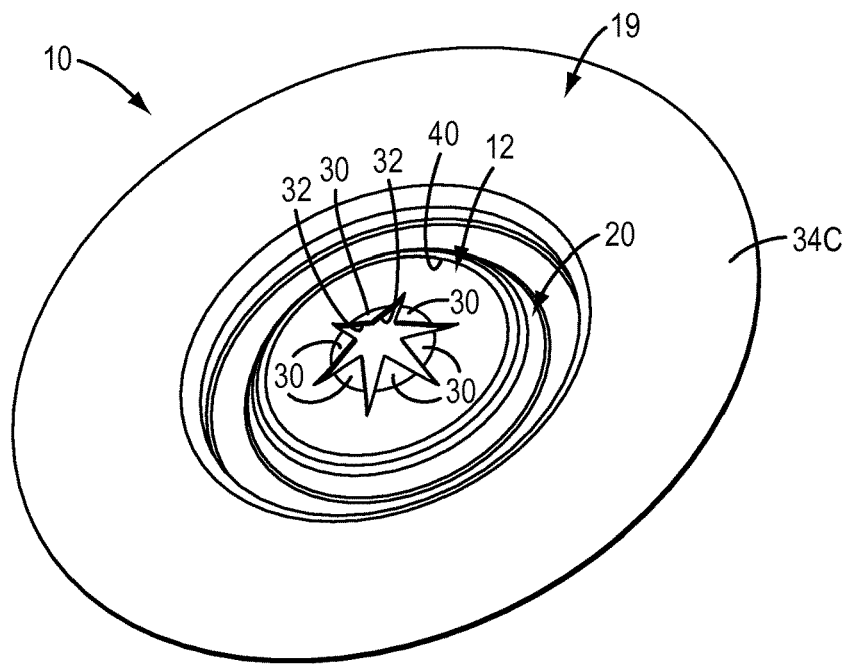
FIG. 5 is a view similar to FIG. 1, but showing the valve in the open condition.
Figure 6:
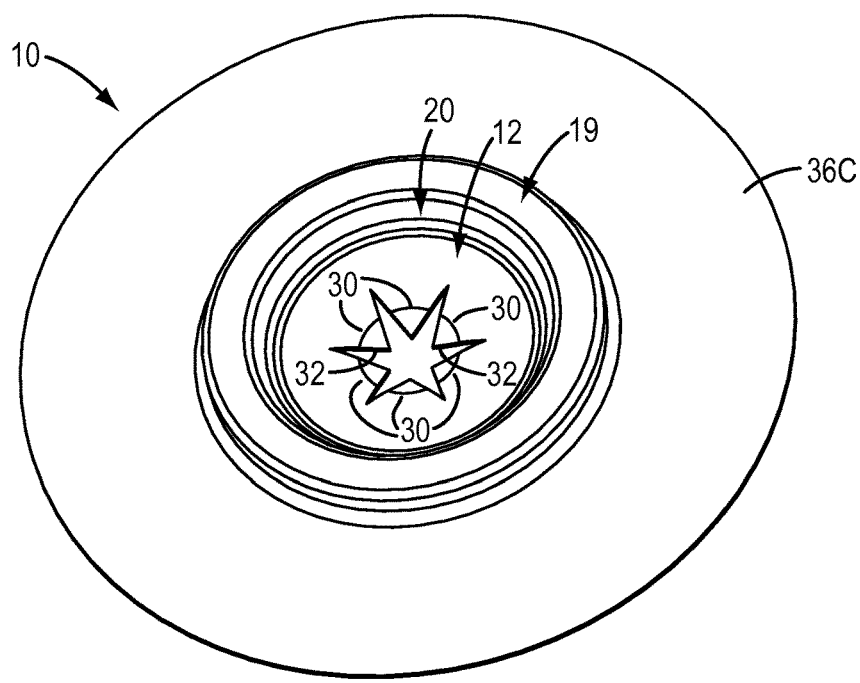
FIG. 6 is a view similar to FIG. 2, but showing the valve in the open condition.
Figure 7:
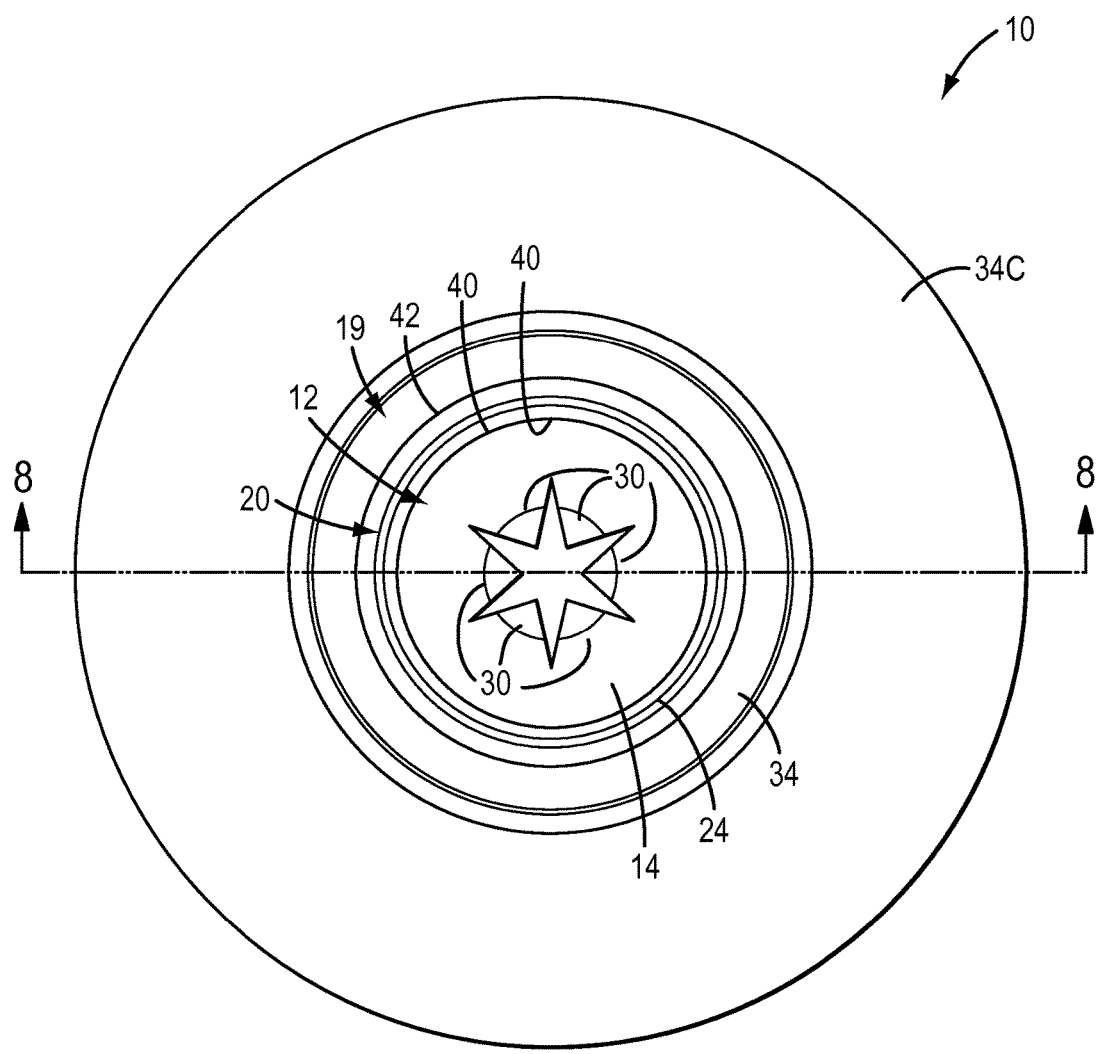
FIG. 7 is a view similar to FIG. 3, but showing the valve in the open condition.

The sleeve 20 has an exterior surface 24 and an interior surface 26. In the illustrated and preferred embodiment, the exterior surfaces 14 and 24 of the head 12 and sleeve 20 are separated from the interior surfaces 16 and 26 by a uniform material thickness T (FIG. 4). Preferably the thickness T is less than or equal to 0.020 inches, and in more highly preferred embodiments the thickness T is in the range of 0.001 inch to 0.010 inch, and in even more highly preferred embodiments, the thickness T is in the range of 0.003 to 0.007 inches. In the illustrated embodiment, the thickness T is equal to 0.005 inch.

Figure 3:
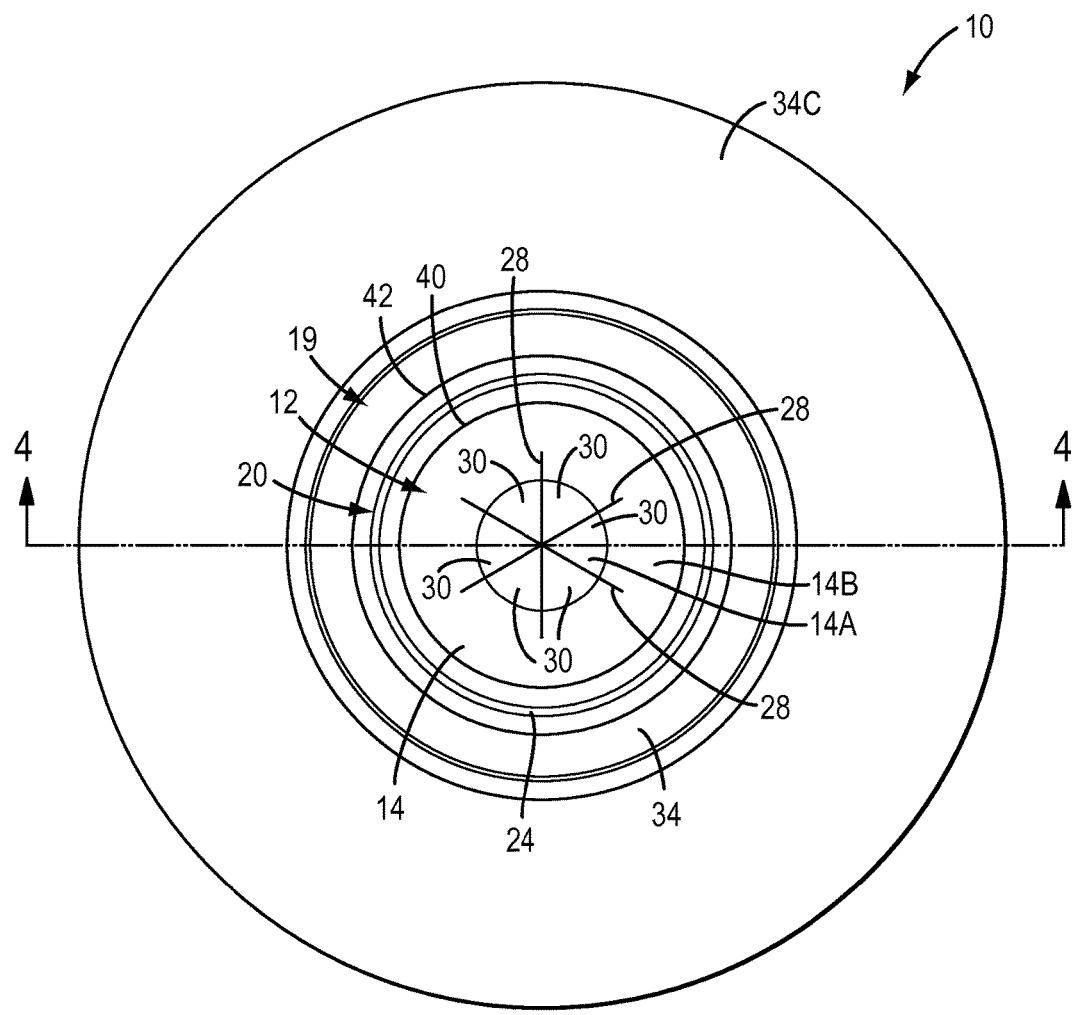
FIG. 3 is a top plan view of the valve of FIGS. 1-2, again with the valve in the closed condition.
Figure 8:
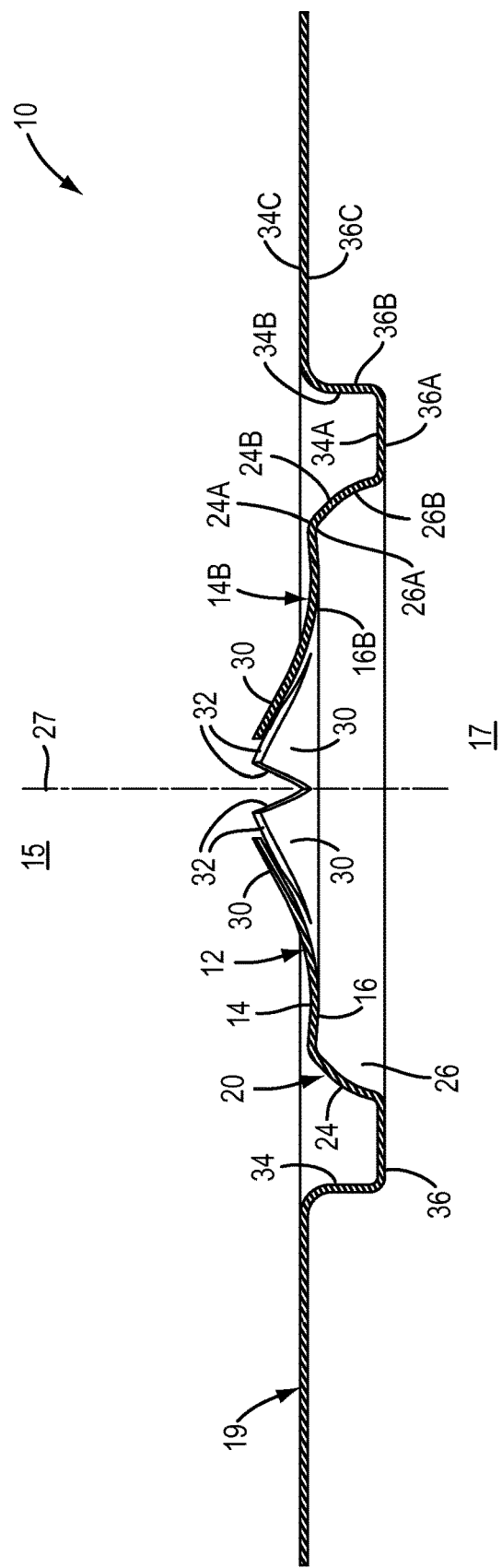
FIG. 8 is a view similar to FIG. 4, but showing the valve in the open condition.
Figure 9:
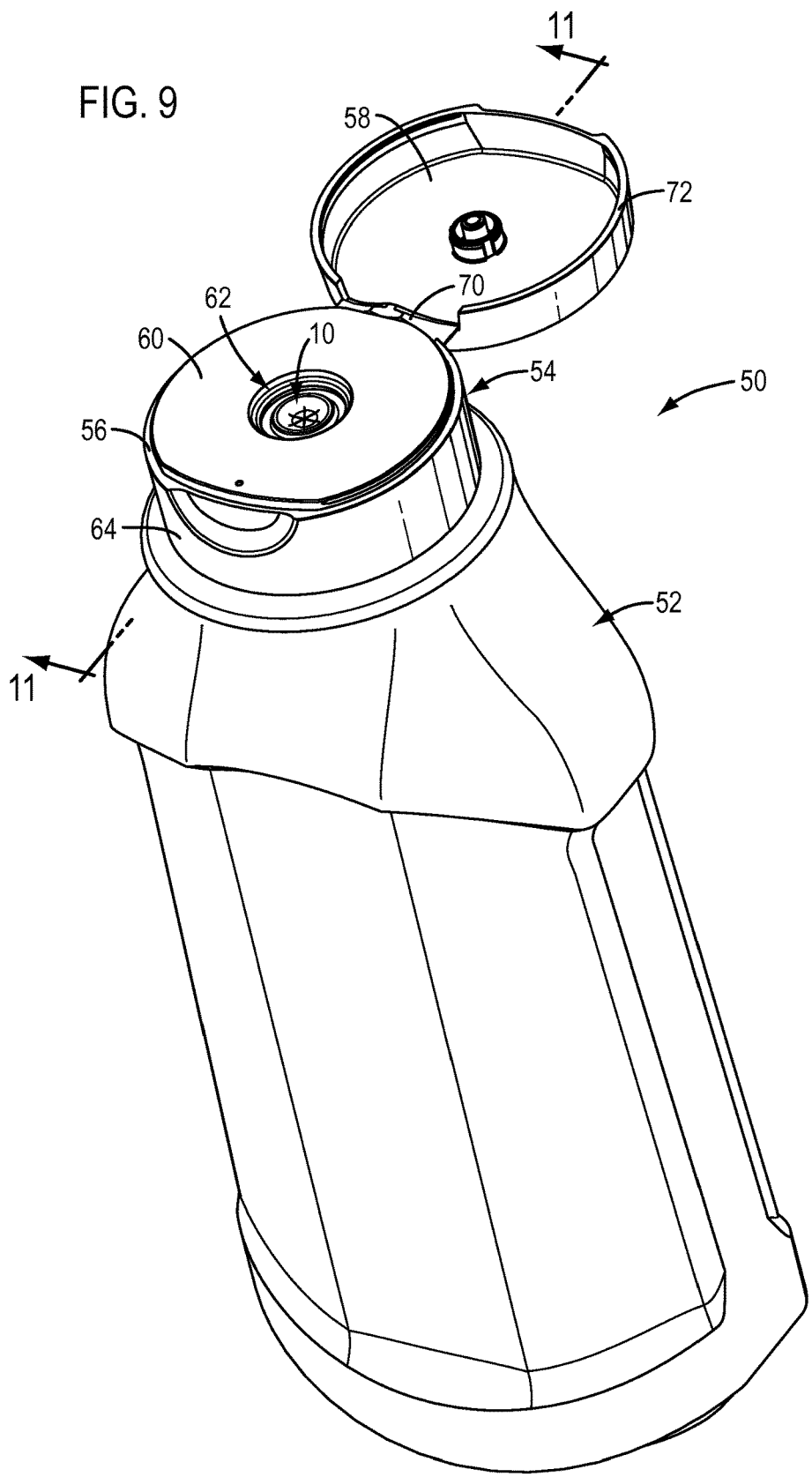
FIG. 9 is an isometric view from above of a fluid dispensing package including a fluent substance container, a fitment in the form of a closure, and the valve of FIGS. 1-8.
Figure 10:
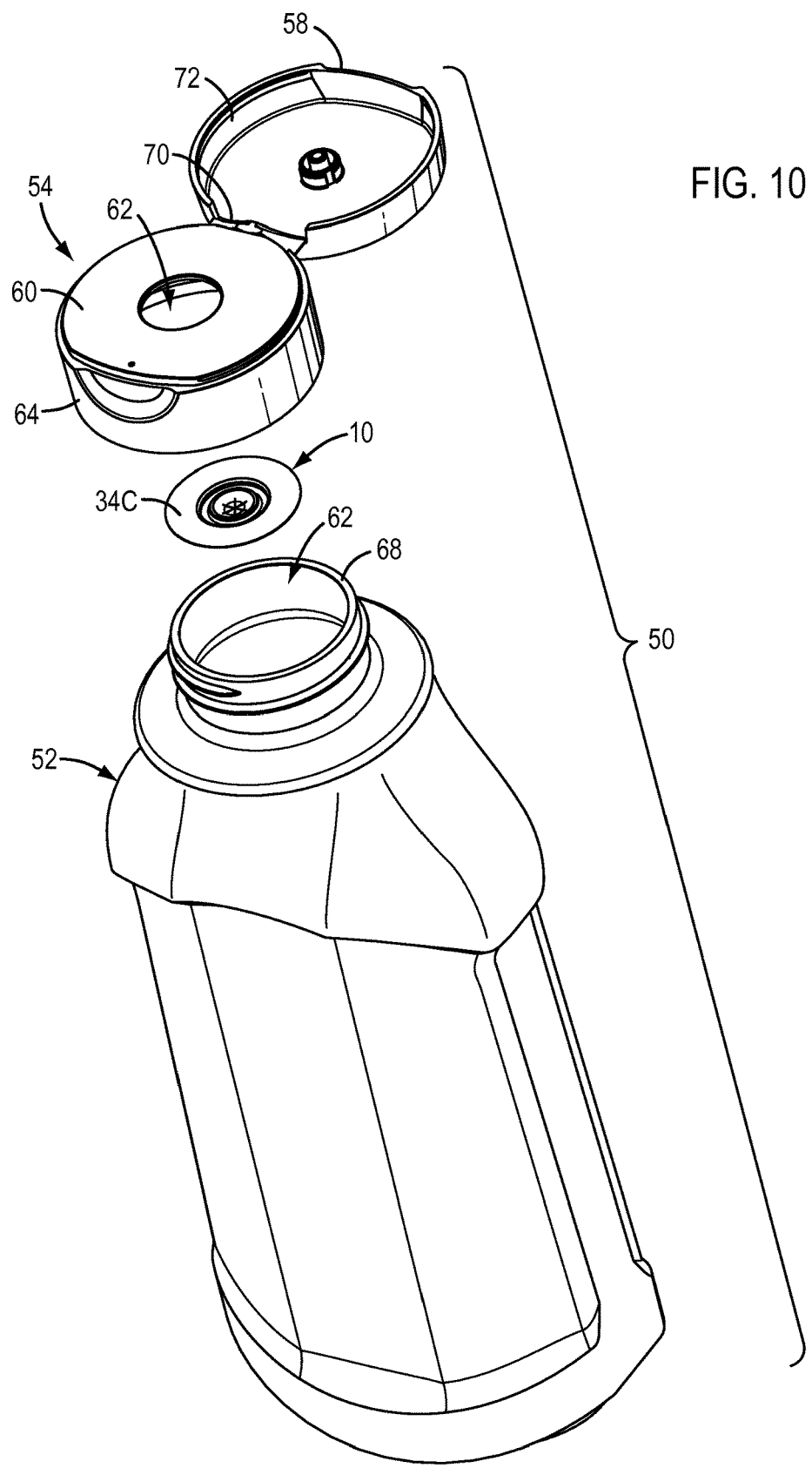
FIG. 10 is an exploded isometric view from above of the package of FIG. 9.
Figure 11:
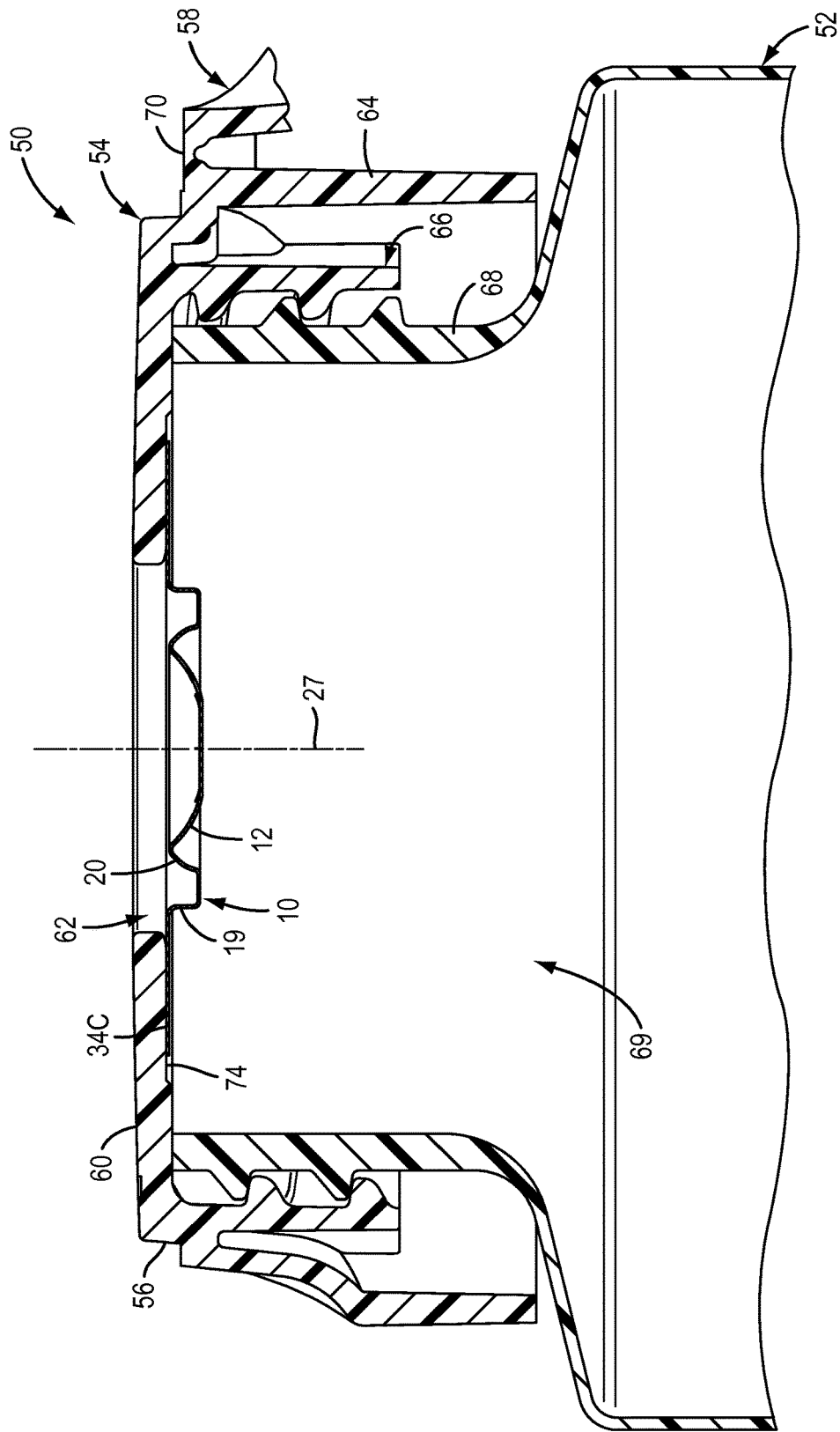
FIG. 11 is an enlarged, fragmentary sectional view taken from line 11-11 in FIG. 9 and showing the valve in the closed condition.
Figure 12:
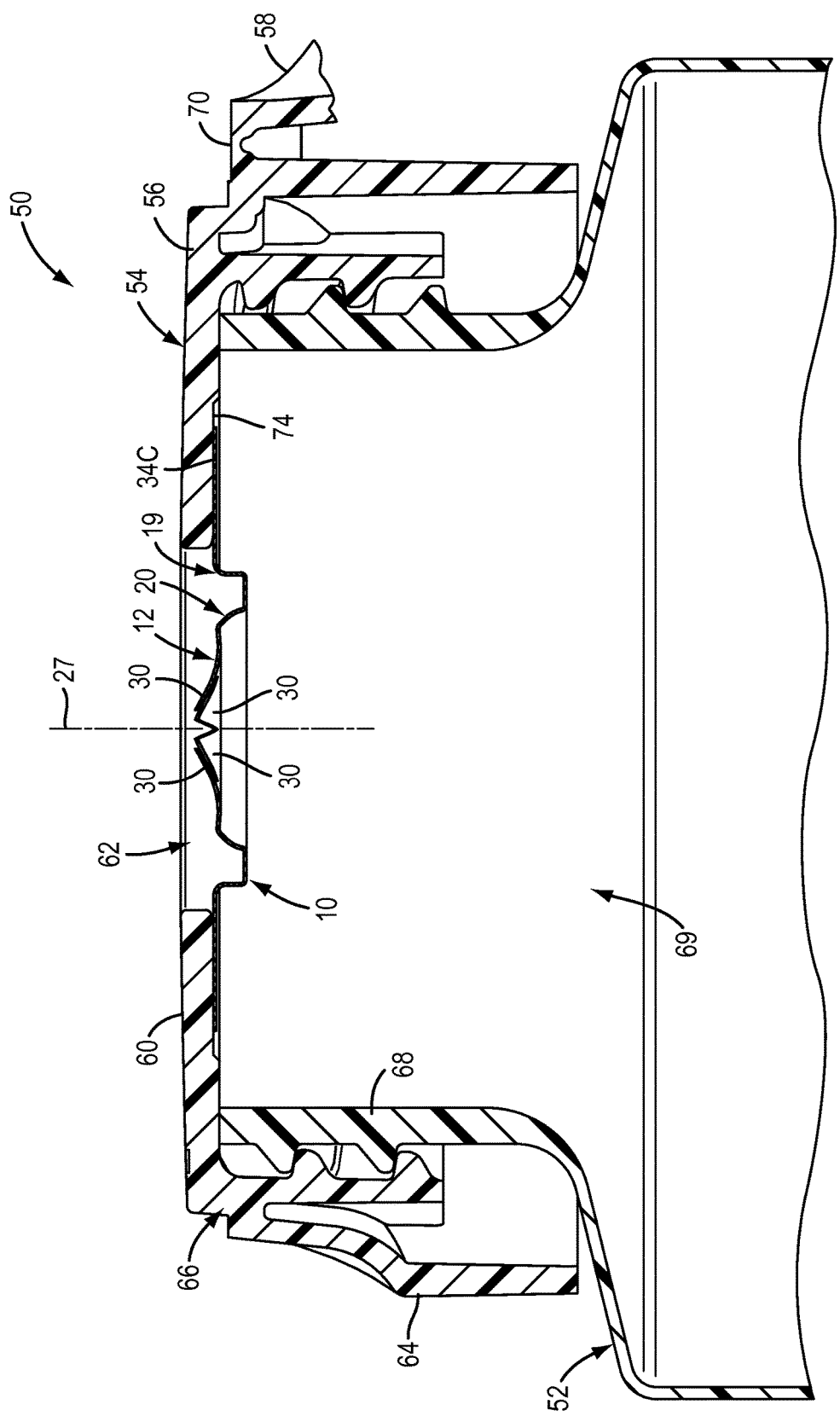
FIG. 12 is a view similar to FIG. 11, but showing the valve in the open condition.
Figure 13:
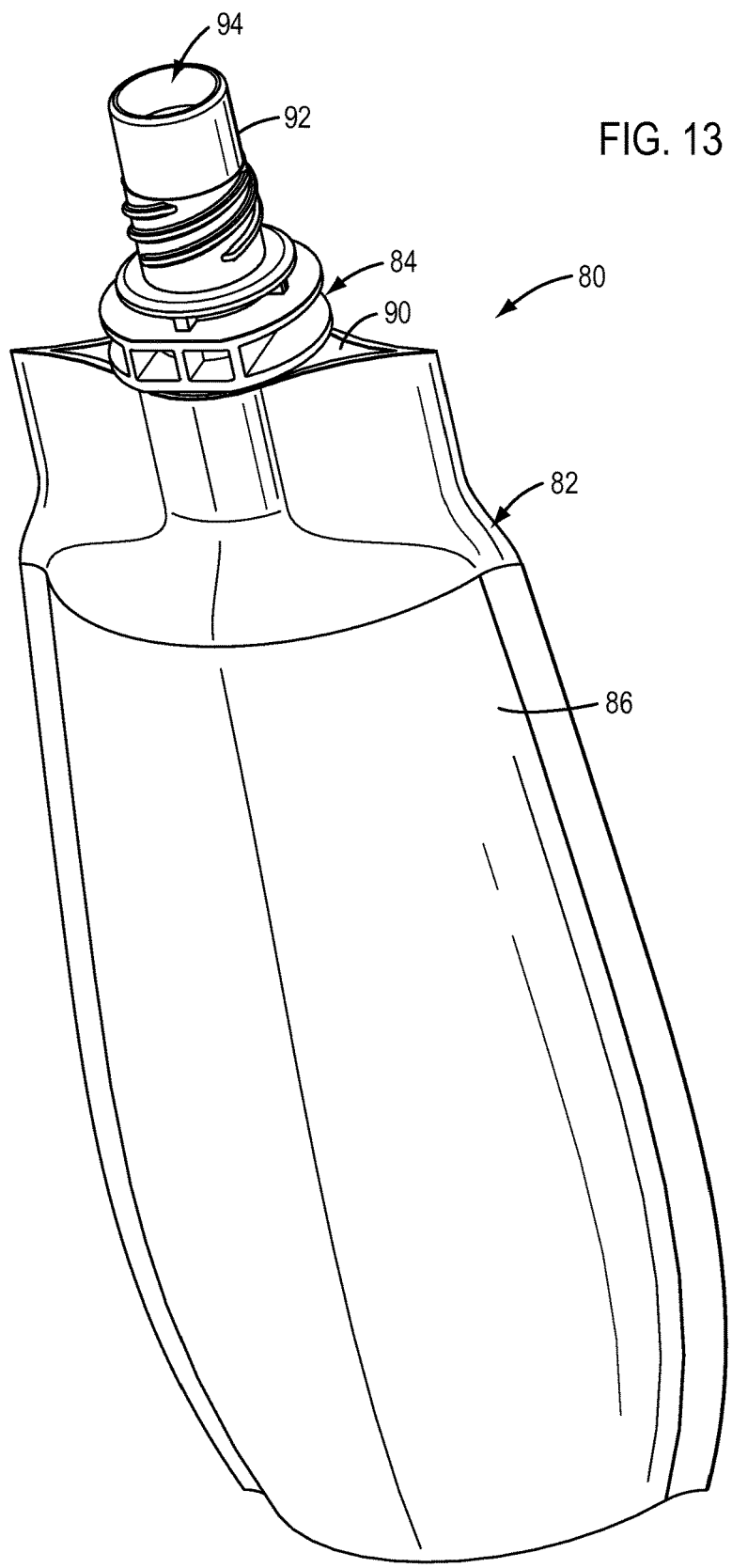
FIG. 13 is an isometric view from above of another fluid dispensing package including a fluid substance container, a fitment, and the valve of FIGS. 1-12.
Figure 14:
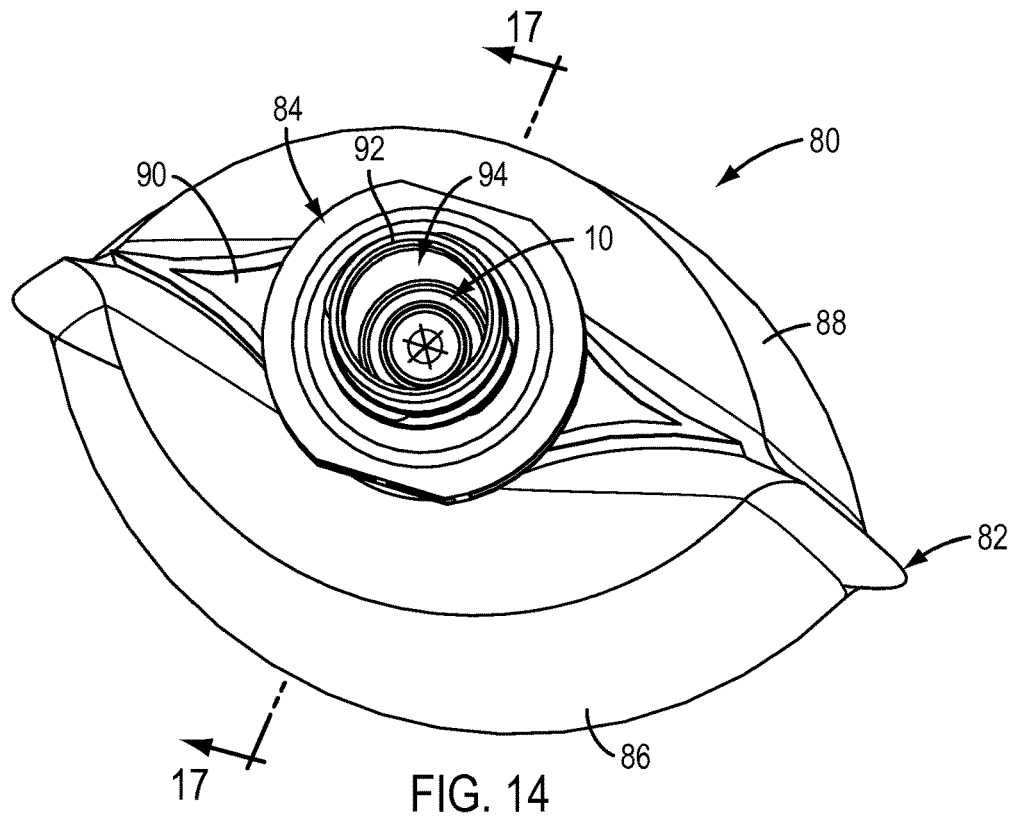
FIG. 14 is another isometric view of the package of FIG. 13, showing the valve in the closed condition.
Figure 15:
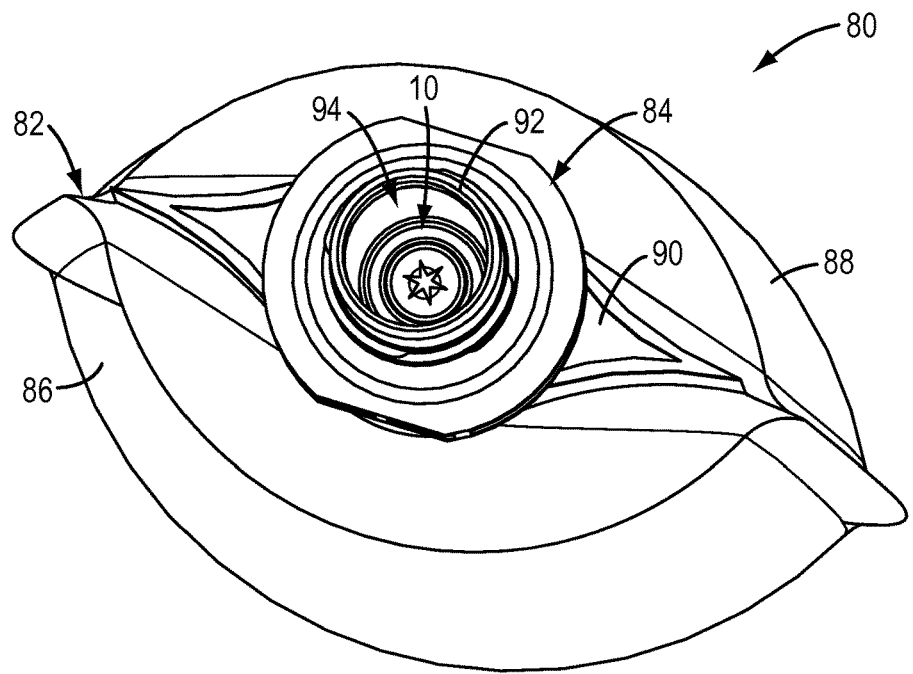
FIG. 15 is a view similar to FIG. 14, but showing the valve in the open condition.
Figure 16:
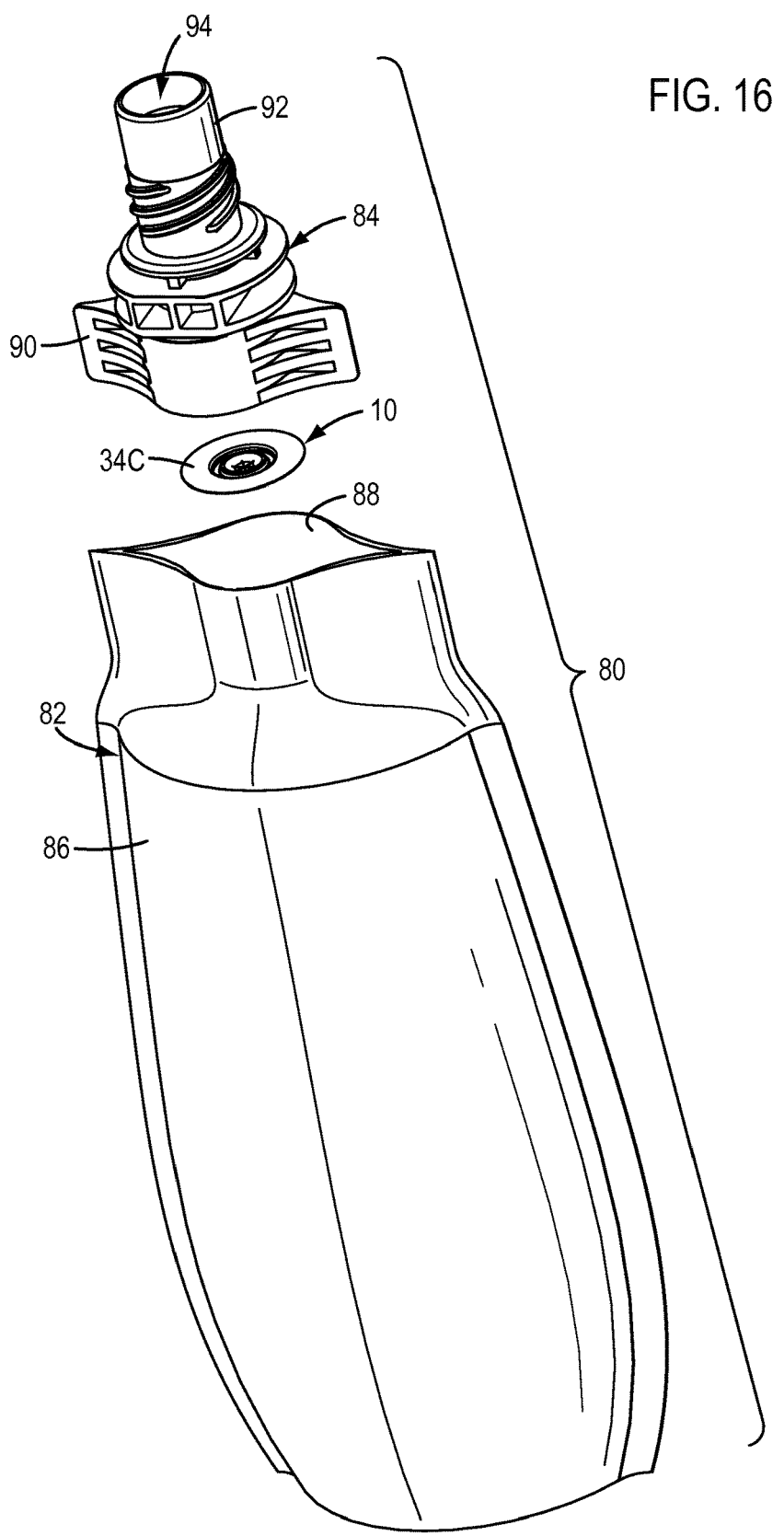
FIG. 16 is an exploded isometric view of the package of FIGS. 13-15.

As best seen in FIGS. 3 and 8, the head 12 has planar, intersecting, self-sealing slits 28 which together define a closed orifice when the valve 10 is in the closed condition. It will be understood that in the as-formed, closed condition of the valve 10 shown in FIGS. 1-4, each slit 28 is closed and does not define an open slot. Preferably, the slits 28 are equally spaced from each other and equal in length. In the illustrated form of the valve 10, the slits 28 define six, generally sector-shaped, equally sized flaps or petals 30 in the head 12. The flaps or petals 30 may also be characterized as "openable regions" or "openable portions" of the valve head 12. Each flap or petal 30 has a pair of diverging transverse faces 32 (FIG. 8) defined by the slits 28, and each transverse face 32 seals against a confronting transverse face 32 of an adjacent petal 30 when the valve 16 is closed. While the valve 10 can be formed with the slits 28, it is preferred that the slits 28 be subsequently cut into the head 12 of the valve 10 by suitable conventional techniques. As another alternative, at least one slit 28 could be partially formed into the head 12, with the remainder of the at least one partially formed slit 28 being cut, severed, punctured, torn, broken or otherwise separated after molding. In this regard, it should be understood that as used herein, the term "slit valve" is intended to refer to any valve that has one or more slits, such as slits 28, in its final functioning form, including such a valve wherein one or more of the slits, such as a partially formed slit 28, is/are only fully completed after the valve has been formed and/or installed in its operational environment, such as, for example, a valve 10 having at least one partially formed slit 28 with a frangible portion installed in a fitment of a dispensing package or machine, with the frangible portion of the at least one partially formed slit 28 being intact during installation and then cut, severed, punctured, torn, broken or otherwise separated after installation to complete the at least one slit 28 and place the valve 10 in its final functioning form.

It is to be understood that the orifice of the valve 10 may be defined by structures other than the illustrated straight slits 28. Further, the slits 28 may have various different shapes, sizes and/or configurations in accordance with the requirements and parameters of each particular application. For example, the orifice may also include only one slit 28 or two or more intersecting slits 28.

The valve 10 has a normally closed position or condition shown in FIGS. 1-4. The valve 10 is typically designed to remain closed when the pressure differential across the valve head 12 is below a predetermined amount, with the petals 30 defining a normally closed orifice configuration. The valve 10 can be forced to one or more open positions or configurations, as shown in FIGS. 5-8, when a sufficiently high pressure differential is applied across the valve 12 thereby moving the petals 30 in a first or opening direction toward the exterior environment to an open orifice configuration. When the pressure differential across the valve 10 is decreased sufficiently, the inherent resiliency of the valve 10 allows the valve 10 to return to the normally closed condition (by action of the force generated from the resilient valve's deformational stresses).

The head 12, peripheral attachment portion 19, and sleeve 20 are preferably all symmetrical bodies of revolution centered on a central axis 27. Preferably and as illustrated in FIGS. 1-4, in the as-formed, unconstrained, closed condition, the exterior surface 14 of the head 12 is concave, the interior surface 16 of the head 12 is convex, the exterior surface 24 of the sleeve 20 is convex, and the interior surface 26 of the sleeve 20 is concave. Furthermore, as best seen in FIG. 4, the exterior surface 14 and the interior surface 16 of the head 12 include planar portions 14A and 16A, respectively, extending transversely from the central axis 27 over a limited area adjacent the axis 27. Additionally, the exterior surface 14 and the interior surface 16 of the head 12 include arcuate portions 14B and 16B, respectively, extending laterally from the planar portions 14A and 16A to connect with the sleeve 20. Furthermore, the exterior surface 24 and the interior surface 26 of the sleeve 20 includes arcuate portions 24A and 26A, respectively, extending radially outwardly from the head 12 to respective frustoconical portions 24B and 26B of the exterior surface 24 and interior surface 26, which in turn extend laterally outwardly to respective arcuate surfaces 24C and 26C of the exterior surface 24 and interior surface 26. Additionally, the arcuate surfaces 24C and 26C extend laterally outwardly to connect the peripheral attachment portion 19. It should be appreciated that the head 12 and sleeve 20 are the functional features of the valve 10 that impact the performance of the valve 10, with the attachment portion 19 serving merely as a structure to mount the valve 10 in a fluent substance handling or dispensing system.

In the illustrated embodiment and as best seen in FIG. 4, the peripheral attachment portion 19 has an exterior surface 34 and an interior surface 36, with radially extending, planar portions 34A and 36B extending from the sleeve 20 to cylindrical portions 34B and 36B which extend axially to radially extending, planar portions 34C and 36C. Preferably, blend radiuses connect the arcuate portions 24C and 26C to the planar portions 34A and 36A, respectively, connect the planar portions 34A and 36A to the cylindrical portions 34B and 36B, respectively, and connect the cylindrical portions 34B and 36B to the planar portions 34C and 36C.

The exterior surfaces 14 and 24, respectively, of the head 12 and sleeve 20 intersect at a first circular line of intersection, shown diagrammatically at 40 in FIGS. 1, 3, 4, 5 and 7, which is defined at an inflection point between the convex exterior surface 24 and the concave exterior surface 14 in the illustrated and preferred embodiment. The exterior surface 24 of the sleeve 20 intersects the peripheral attachment portion 19 at a second circular line of intersection, shown diagrammatically at 42 in FIGS. 1, 3, 5 and 7. The interior surface 16 of the head 12 and the interior surface 26 of the sleeve 20 intersect at a third circular line of intersection, shown diagrammatically at 44 in FIGS. 2 and 6, which is defined at an inflection point between the convex interior surface 14 and the concave interior surface 26. The interior surface 26 of the sleeve 20 intersects the peripheral attachment portion 19 at a fourth circular line of intersection, shown diagrammatically at 46 in FIGS. 2 and 6.

In the as-formed, unconstrained, closed condition shown in FIGS. 1-4, the second circular line of intersection 42 is spaced axially in the second direction (toward the interior environment 17) from the first circular line of intersection 40. Furthermore, the fourth circular line 46 of intersection is also spaced axially in the second direction from the third circular line of intersection 44. Additionally, the first, second, third, and fourth circular lines of intersection 40, 42, 44, and 46 lie in parallel planes extending transverse to the central axis 27.

The valve 10 is typically employed in applications wherein the valve 10 is mounted in or to a fluent substance dispensing system, such as a bottle or container, for dispensing or discharging a fluent substance through the valve 10 when a sufficient pressure differential is applied across the valve head 12 to open the valve. Typically, the valve 10 is oriented at the opening of a container holding a fluent substance such that the valve head exterior surface 14 faces outwardly toward the exterior ambient environment and such that the valve head interior surface 16 faces inwardly toward the container interior and interfaces with the fluent substance within the container. The typical operation of such a valve 10 involves the user first tipping the container to point the valve 10 in a downward direction and then applying a pressure differential to the valve head 12 (as by sucking on the exterior side of the valve and/or by squeezing a flexible wall or walls of the container). This causes the valve 10 to open as shown in FIGS. 5-8.

It should be understood the valve 10 may find use with many different types and constructions of closures, containers, and other sources and conduits of fluent substances, that a fluid dispensing package 50 including a fluent substance container 52 and a fitment in the form of a closure 54 is shown in FIGS. 9-12 for purposes of illustration, and that the particular forms or constructions of the fluid dispensing package 50, container 52, and closure 54 form no part of the invention unless expressly recited in an appended claim. For purposes of illustration, the closure 54 comprises a base 56 and a closure lid 58. The base 56 includes a deck 60 having a dispensing port 62 defined therein, and a skirt 64 extending downwardly from the deck 60 and having retention and sealing features, shown generally at 66 in FIG. 11, for engagement with a neck 68 of the container 52 that surrounds a dispensing port 69 of the container 52. The lid 58 is connected to the base 56 by a snap hinge 70 of any suitable construction and includes a rim 72 having a snap fit connection with the base 56 when the lid 58 is placed in a closed condition. The container 52 and the closure 54 are molded from a suitable plastic material, many of which are known. The planar portion 34C of the peripheral attachment portion 19 is joined to an interior, planar surface 74 of the deck 60 by any suitable means to form a sealed structural connection that maintains the head 12 of the valve extending across the ports 62 and 69 of the container 52, including, for example, by heat bonding, adhesive bonding, and material bonding such as could be achieved by injection molding. In operation, the valve 10 can be moved from the closed condition shown in FIGS. 9-11 to the open condition shown in FIG. 12 by a user applying pressure to the exterior side walls of the container 52 to increase the pressure differential across the head 12 of the valve 10 to dispense fluid substance from the container 50 via the port 69 and valve 10.

Figure 17:
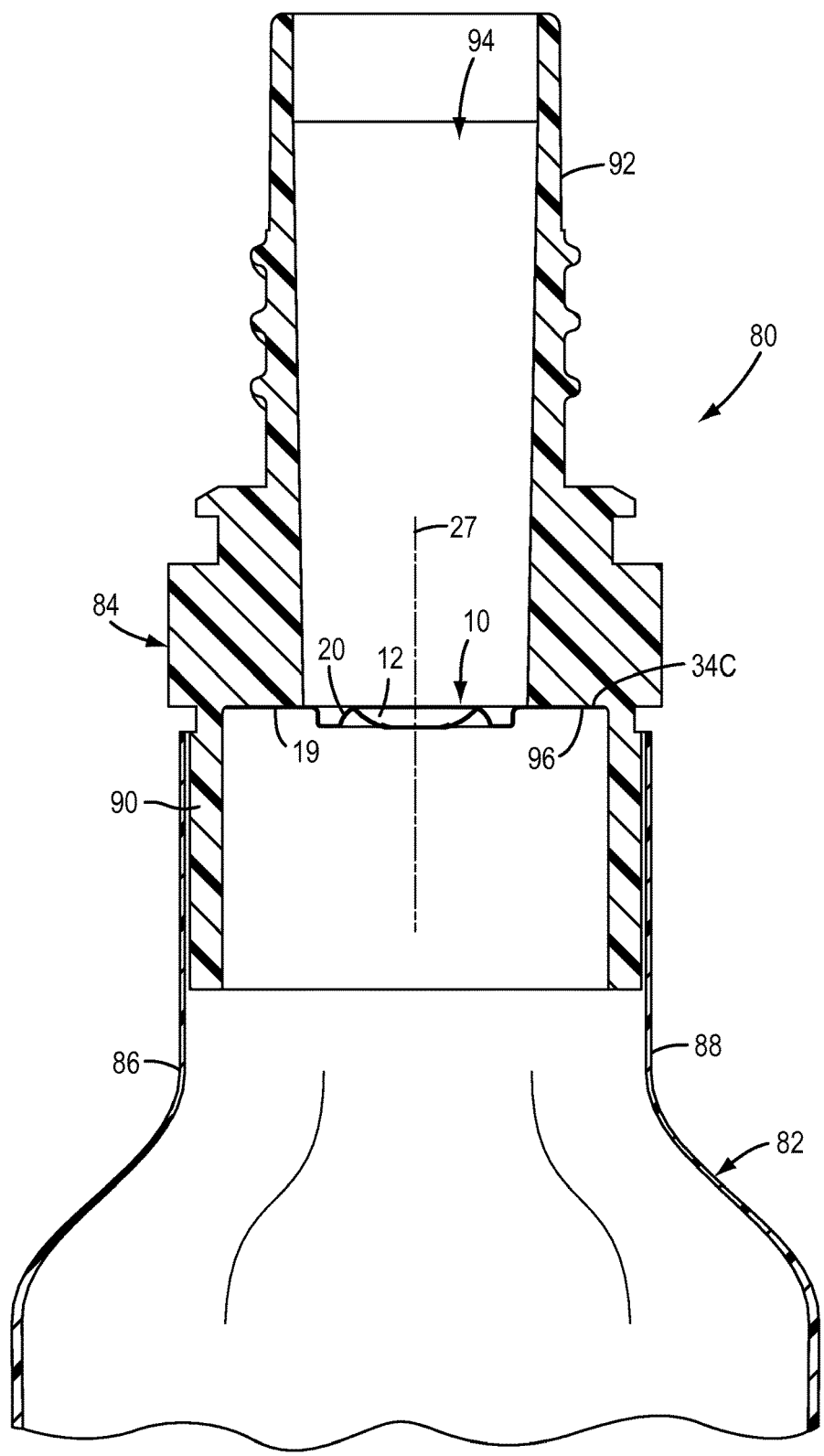
FIG. 17 is an enlarged sectional view taken from line 17-17 in FIG. 14 and showing the valve in the closed condition.
Figure 18:
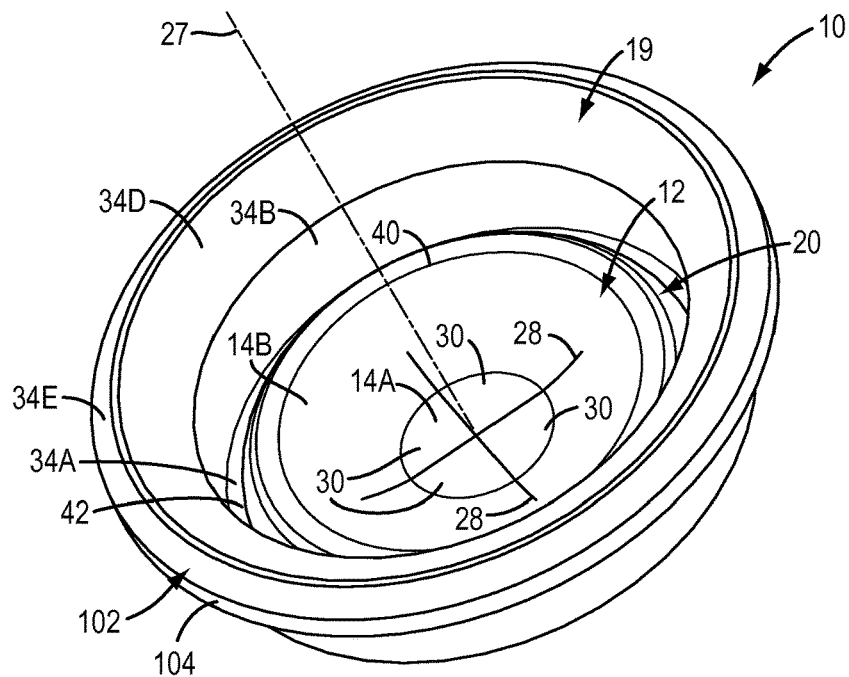
FIG. 18 is an isometric view from above of another embodiment of a valve according to the invention, with the valve shown in a closed condition.
Figure 19:
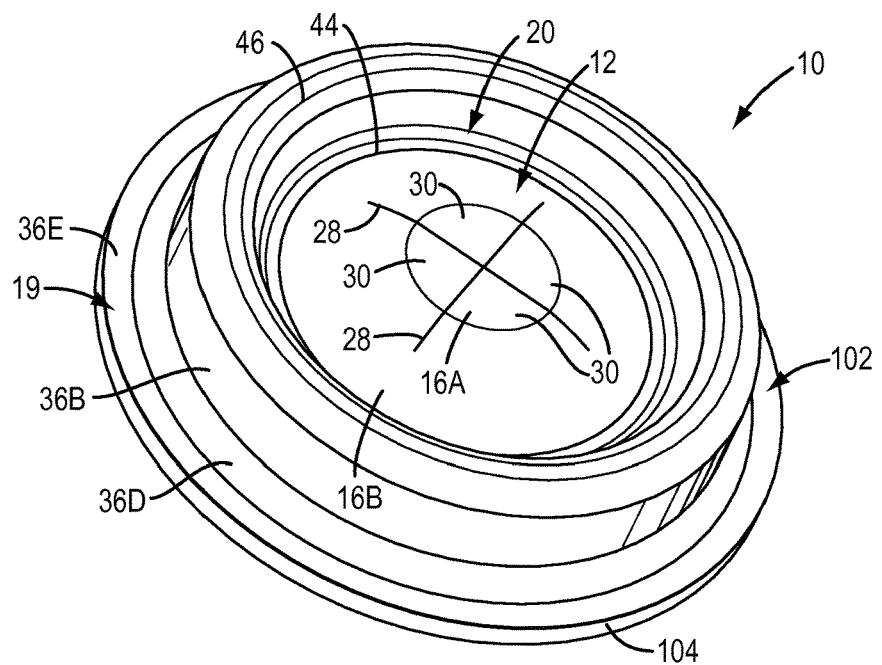
FIG. 19 is an isometric view from below of the valve of FIG. 18, again showing the valve in the closed condition.
Figure 20:
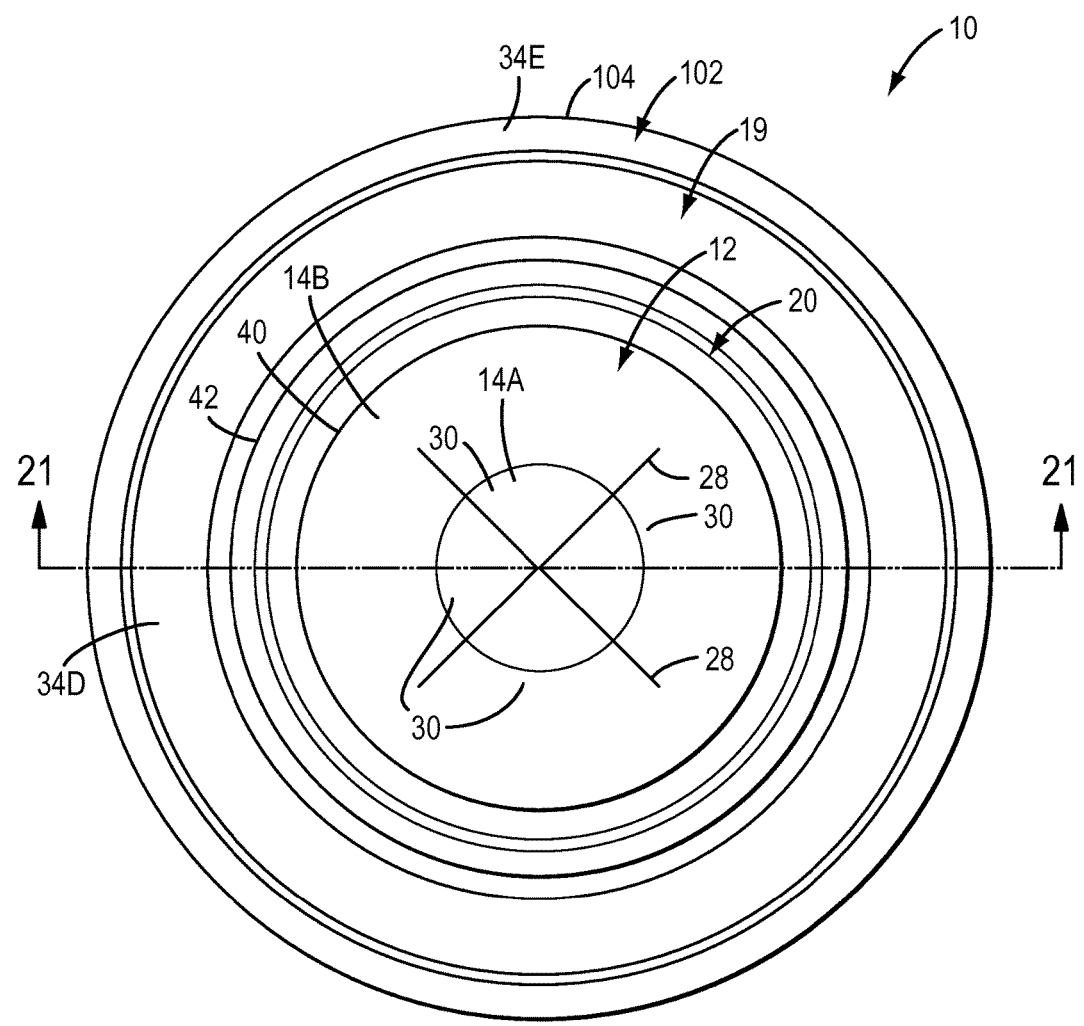
FIG. 20 is a top plan view of the valve of FIG. 18, again with the valve in the closed condition.
Figure 21:
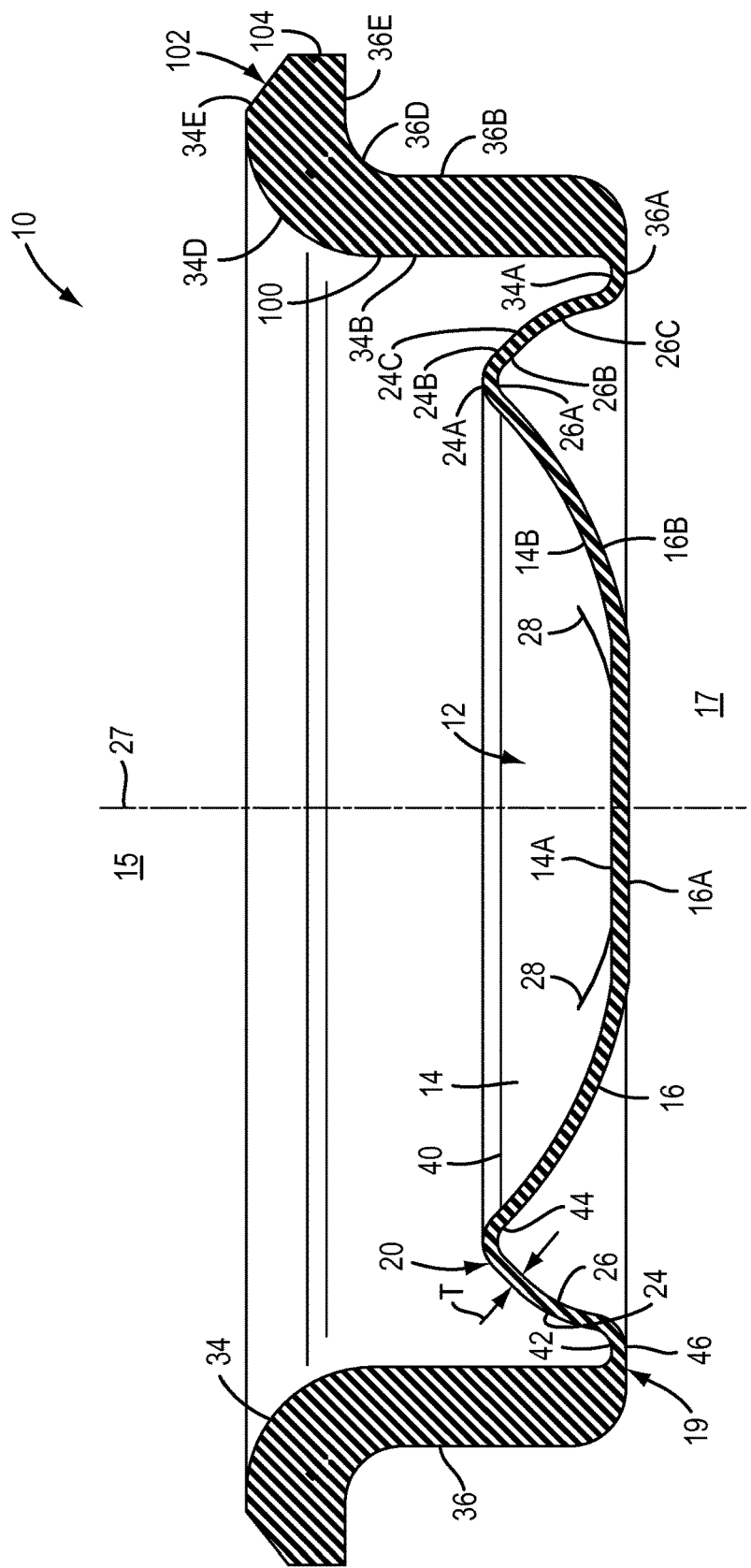
FIG. 21 is an enlarged section view taken from line 21-21 in FIG. 20.
Figure 22:
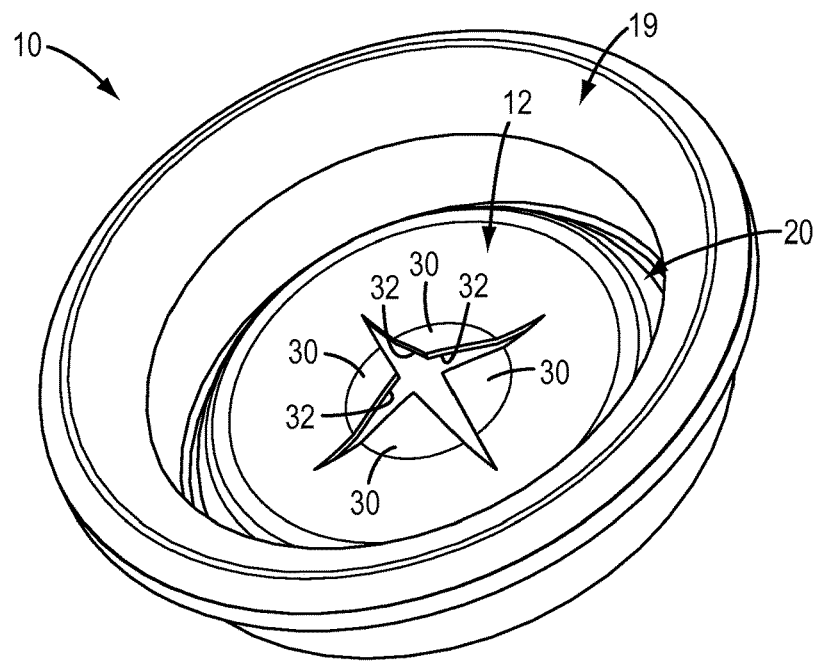
FIG. 22 is a view similar to FIG. 18, but showing the valve in the open condition.
Figure 23:
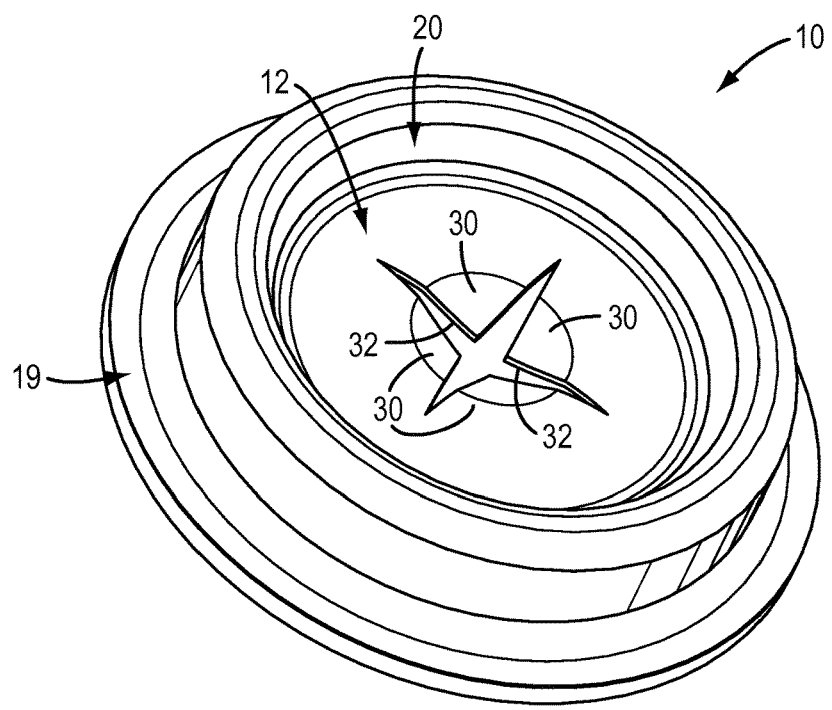
FIG. 23 is a view similar to FIG. 19, but showing the valve in the open condition.
Figure 24:
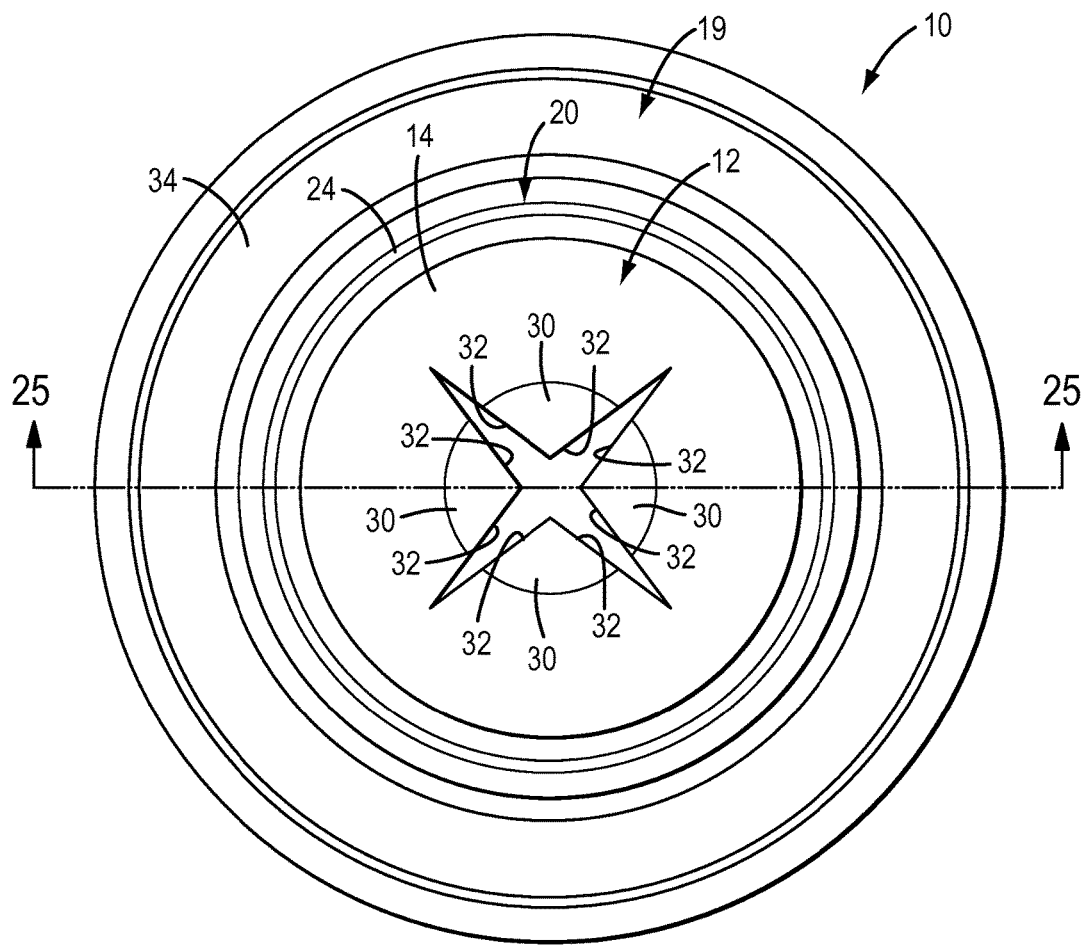
FIG. 24 is a view similar to FIG. 20, but showing the valve in the open condition.
Figure 25:
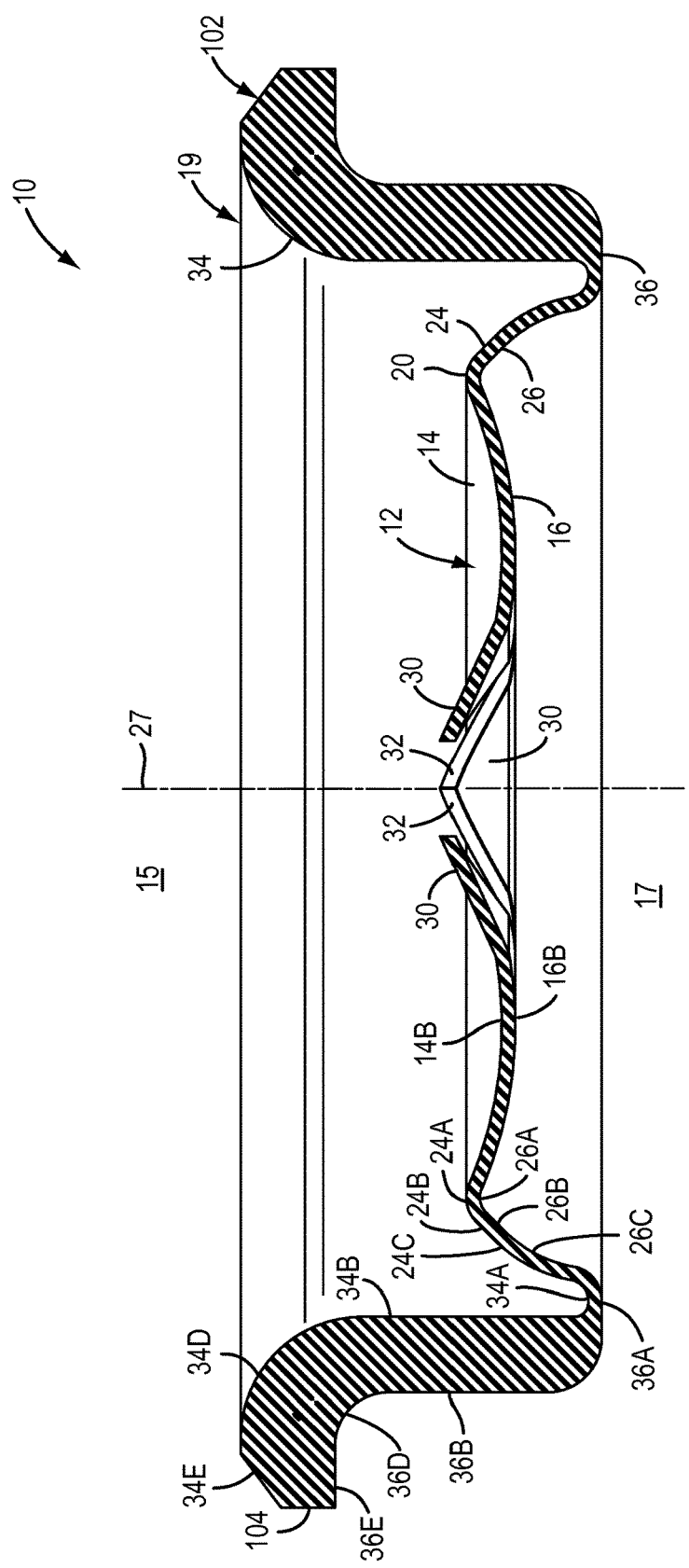
FIG. 25 is a view similar to FIG. 21, but showing the valve in the open condition.
Figure 26:
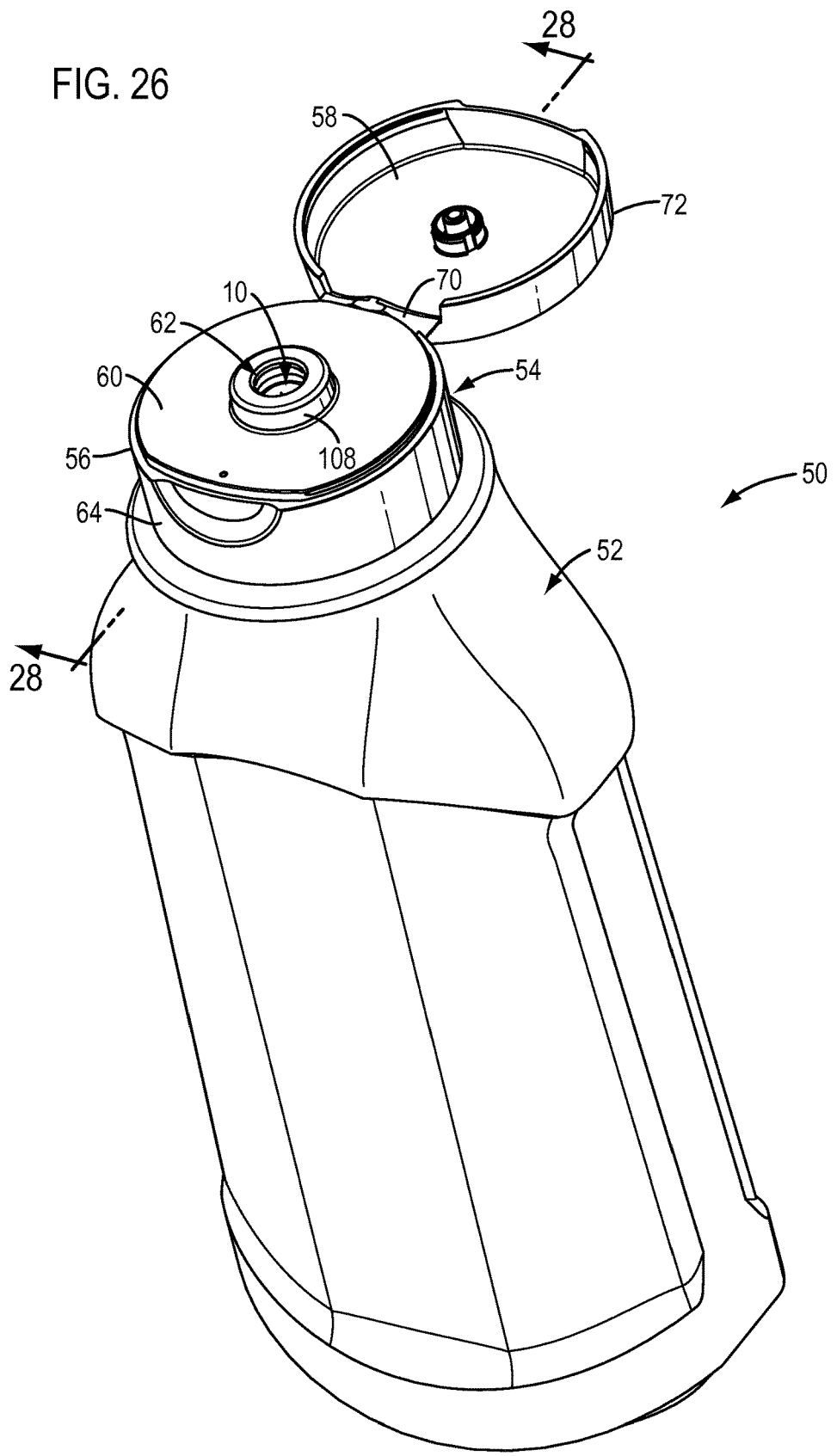
FIG. 26 is an isometric view of a dispensing package similar to the dispensing package of FIGS. 9-12, but showing the valve of FIGS. 18-25.
Figure 27:
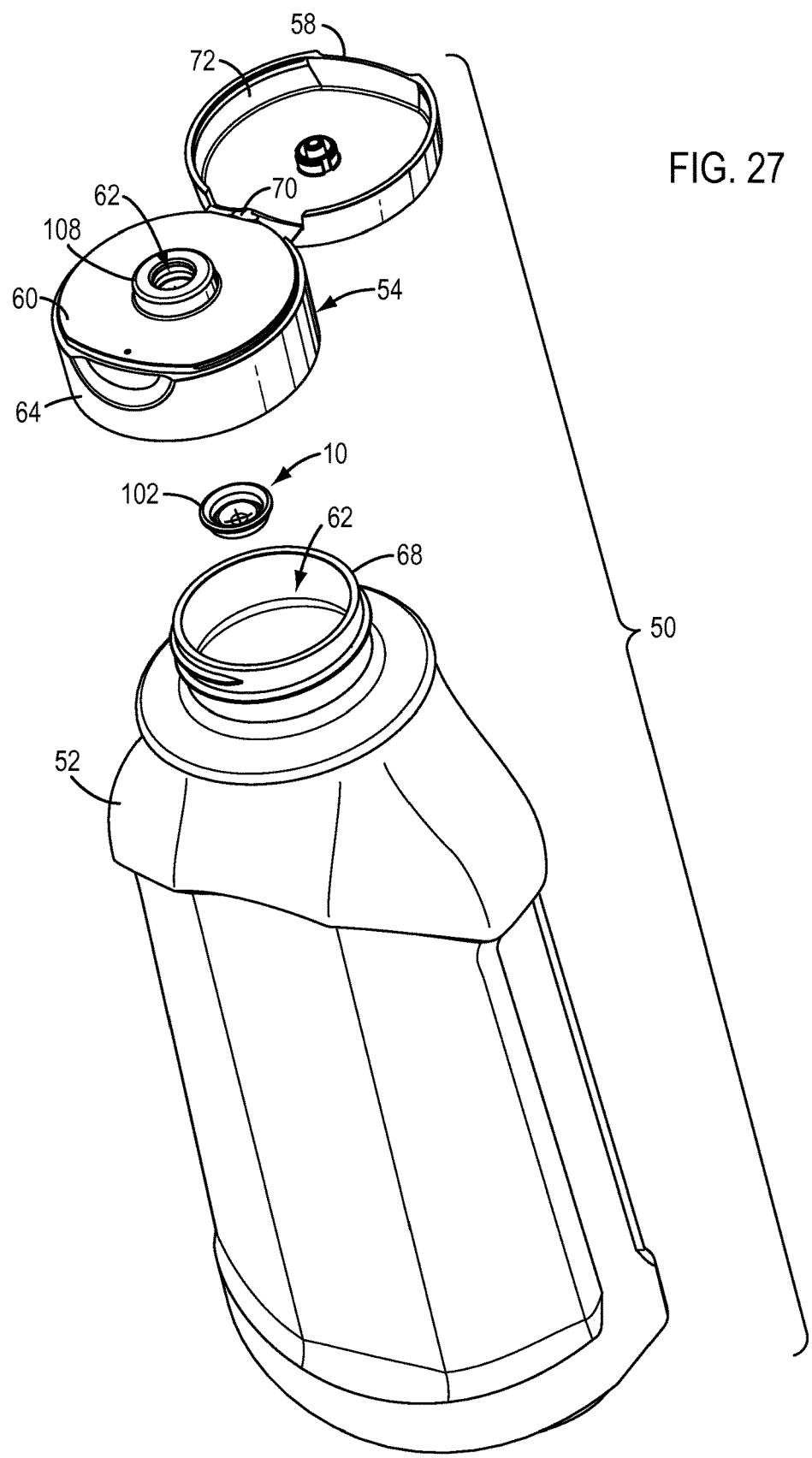
FIG. 27 is an exploded isometric view of the dispensing package of FIG. 26.
Figure 28:
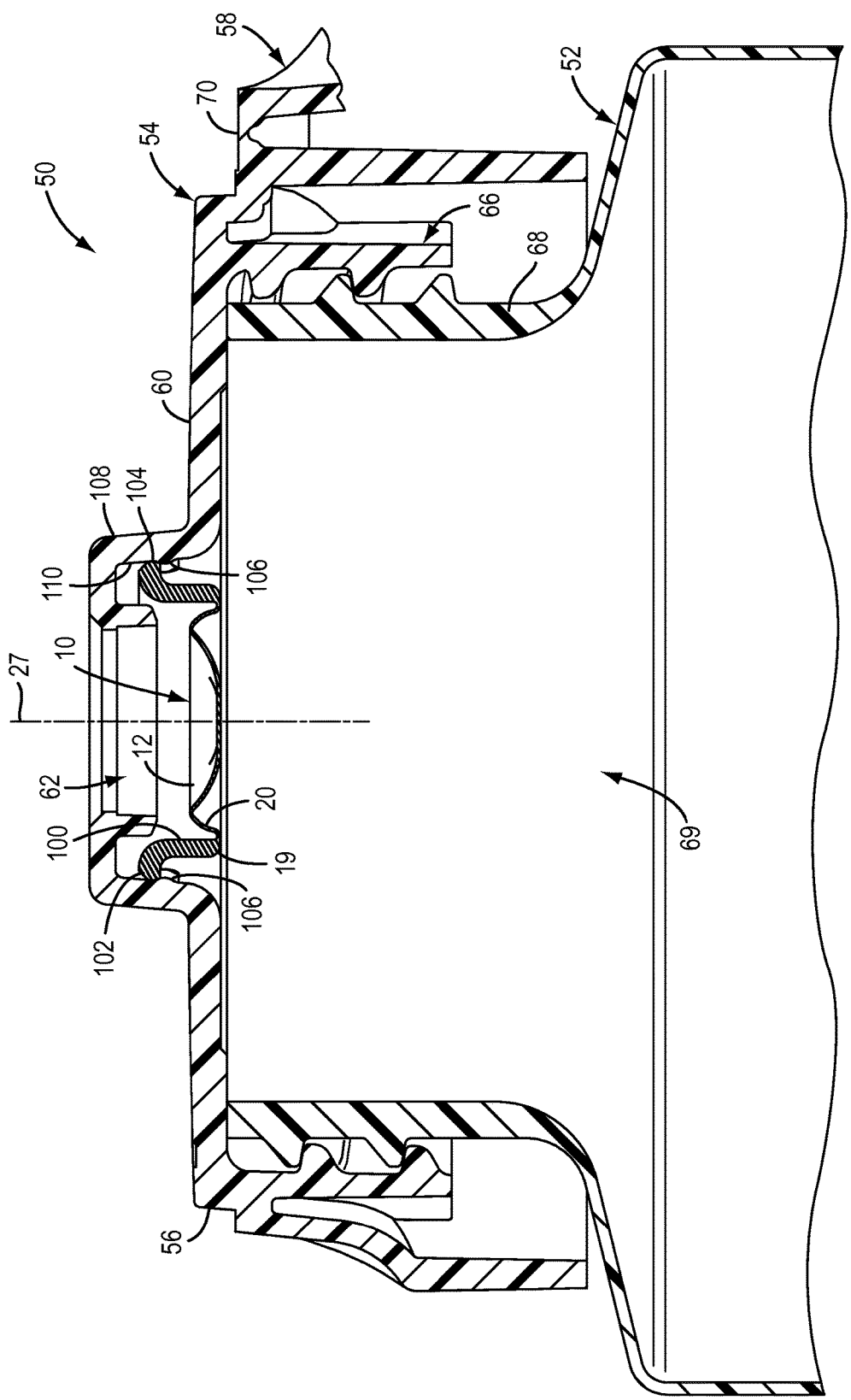
FIG. 28 is a fragmentary, section view taken from line 28-28 in FIG. 26, and showing the valve in a closed condition.
Figure 29:
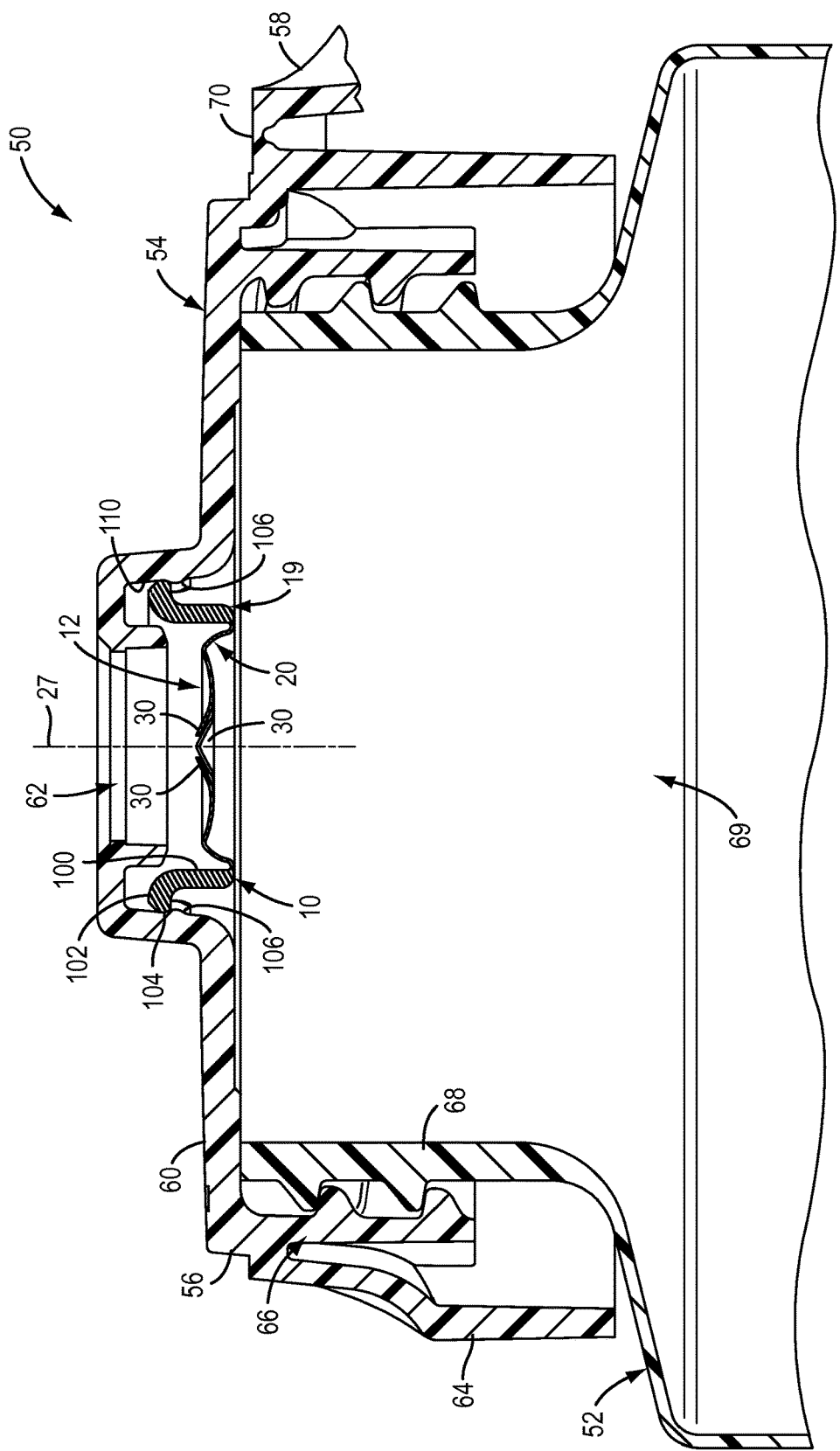
FIG. 29 is a view similar to FIG. 28, but showing the valve in an open condition.
Figure 30:
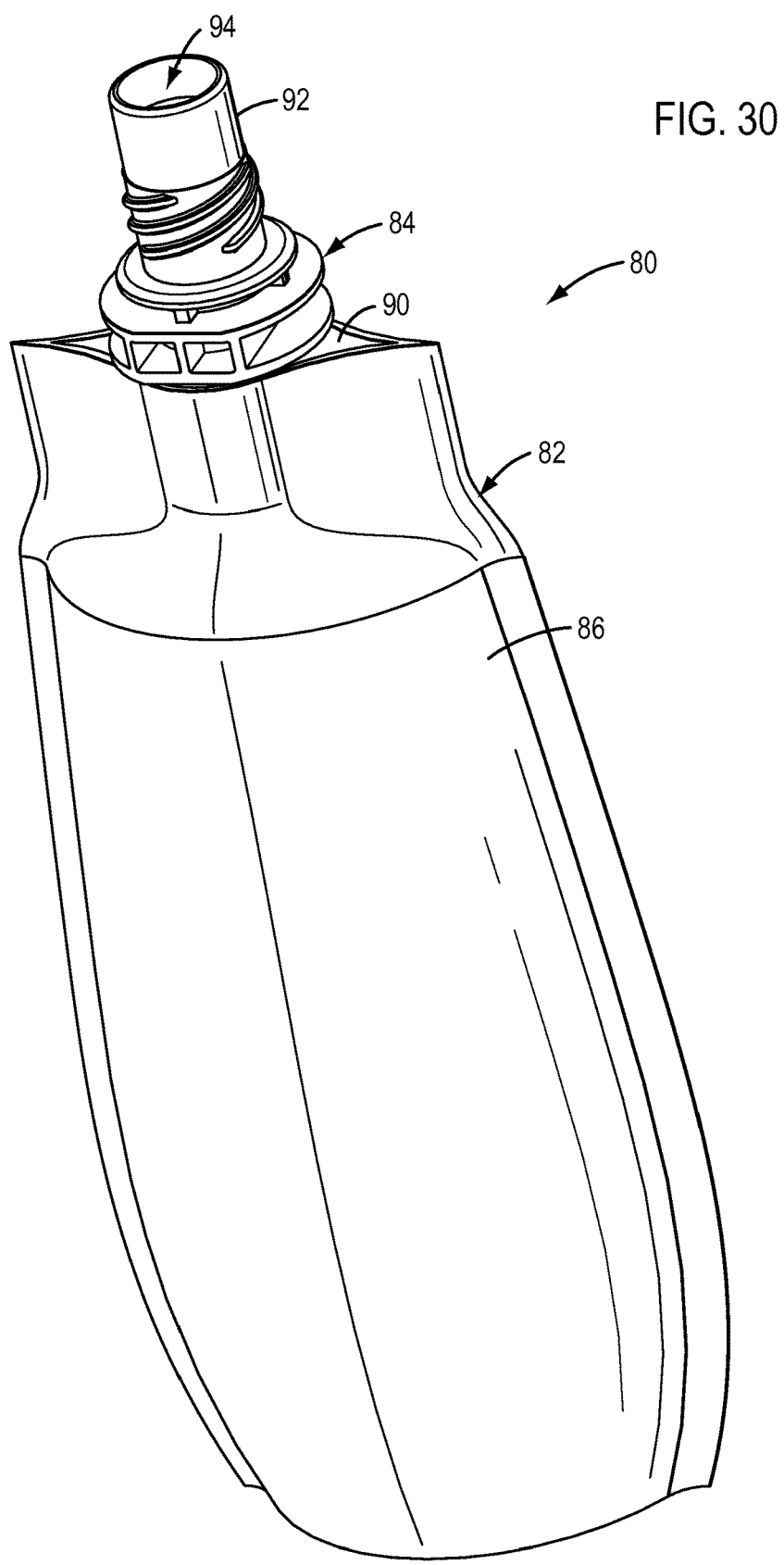
FIG. 30 is an isometric view of another dispensing package including the valve of FIGS. 18-29.
Figure 31:
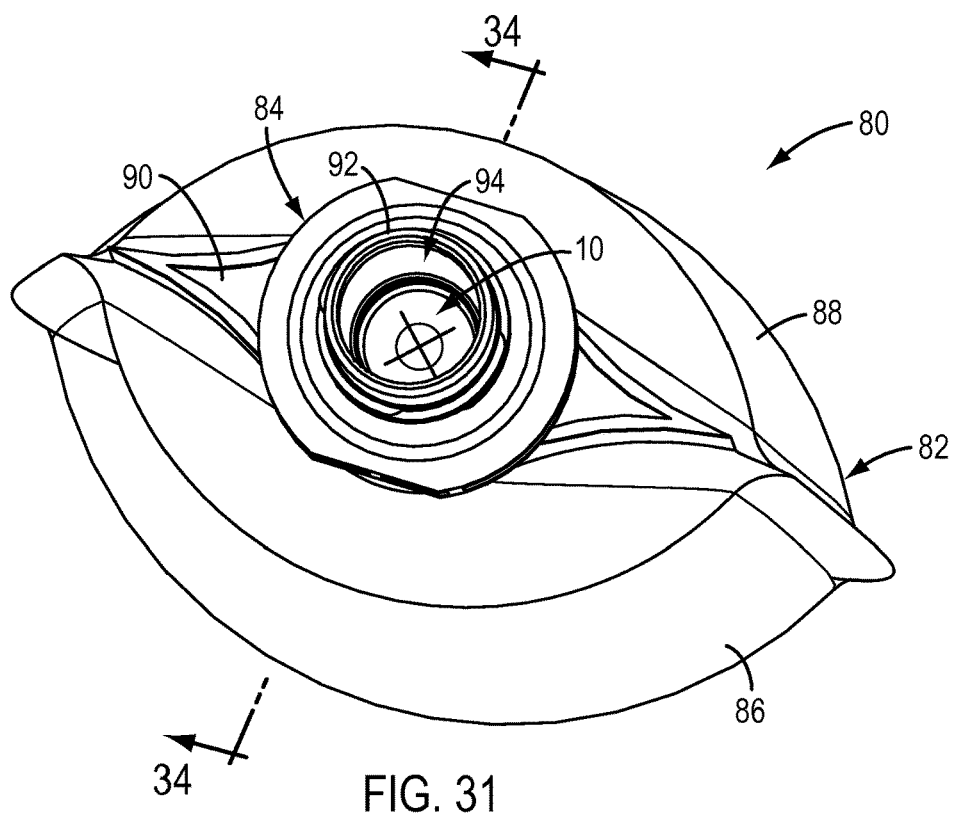
FIG. 31 is another isometric view of the package of FIG. 30 and showing the valve in the closed condition.
Figure 32:
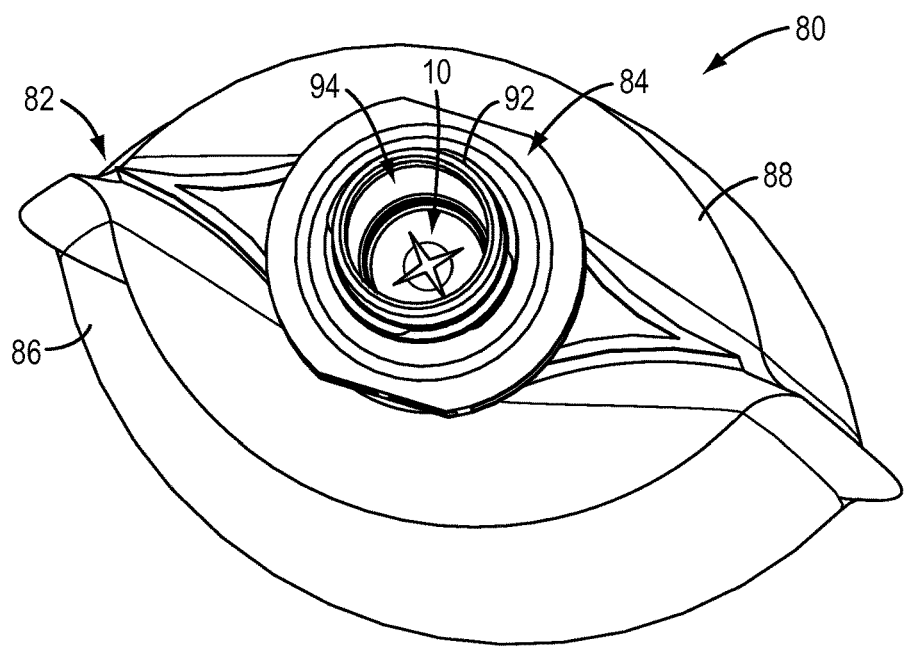
FIG. 32 is a view similar to FIG. 31, but showing the valve in the open condition.
Figure 33:
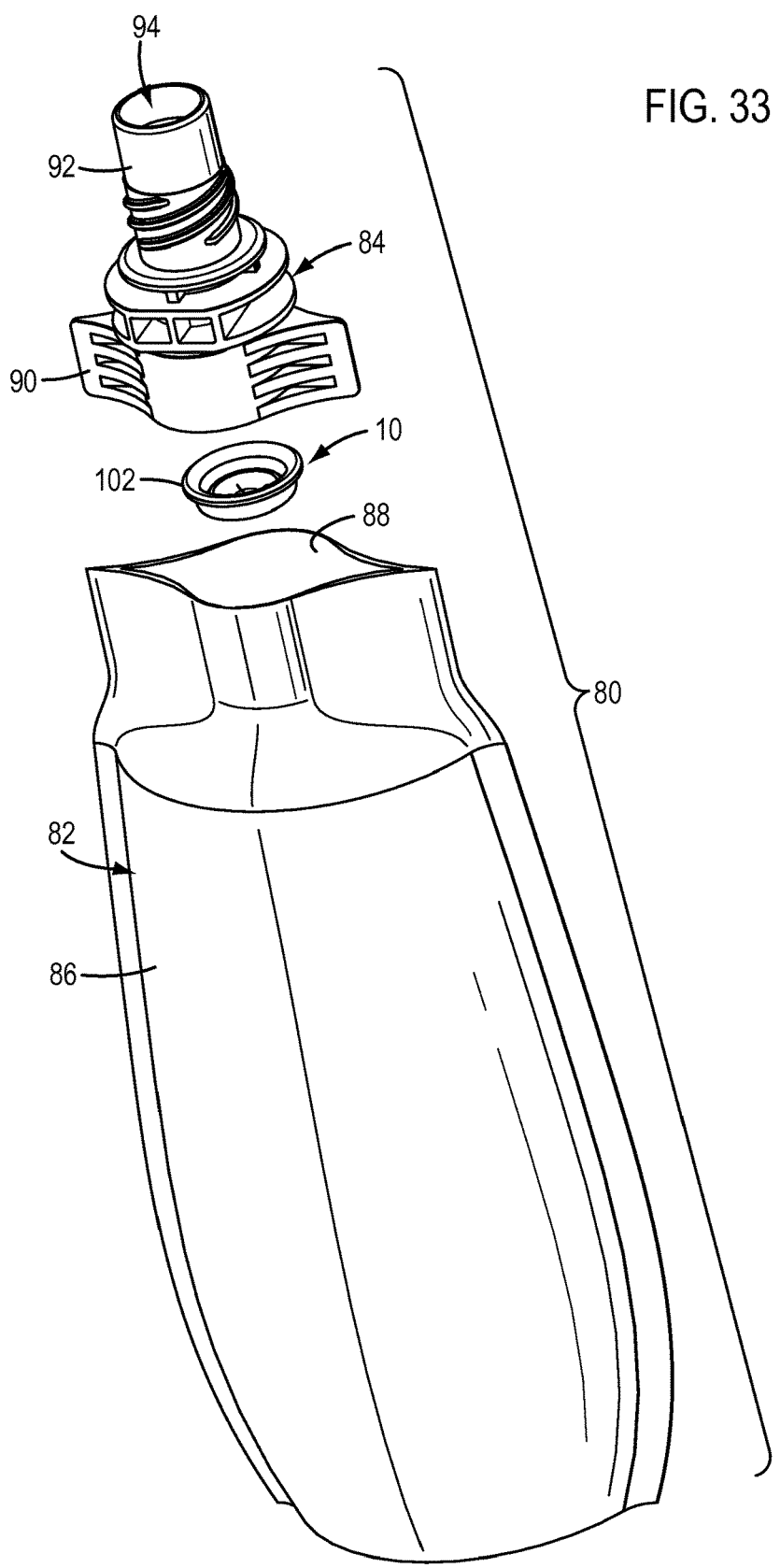
FIG. 33 is an exploded isometric view of the package of FIGS. 30-32.
Figure 34:
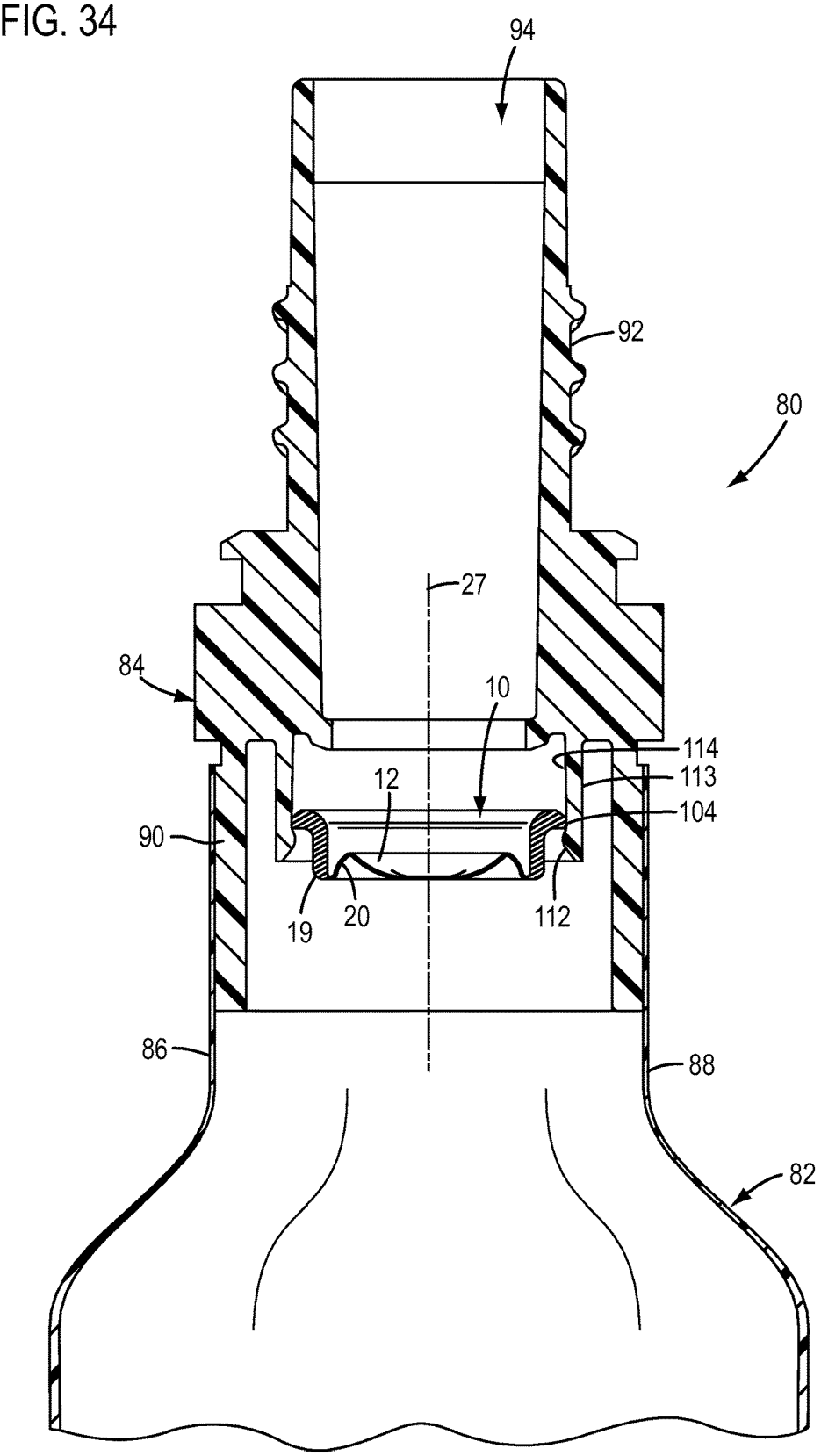
FIG. 34 is an enlarged section view taken from line 34-34 in FIG. 31 and showing the valve in a closed condition.

By way of further example, FIGS. 13-17 show another dispensing package 80 in which the valve 10 can be employed, with the package 80 including a fluid substance container in the form of a pouch 82 and a fitment 84. The pouch 82 includes side walls in the form of two flexible web portions 86 and 88 that are joined and sealed to together such as by heat welding to each other at their peripheral edges and to a wedge shaped tailpiece 90 of the fitment 84. The web portions 86 and 88 are typically made from a flexible, heat-sealable, polymeric sheet or from a flexible, paperboard or metal foil sheet having a heat-sealable, polymeric lining. The fitment 84 is typically molded from a suitable plastic, many of which are known. The fitment 84 includes a dispensing spout 92 with a dispensing port 94 extending through the tailpiece 90 and the spout 92 for dispensing fluid substance from the pouch 82. As best seen in FIG. 17, the planar portion 34C of the peripheral attachment portion 19 is joined to an interior, planar surface 96 of the fitment 94 by any suitable means to form a sealed structural connection that maintains the head 12 of the valve extending across the port 94, including, for example, by heat bonding, adhesive bonding, and material bonding such as could be achieved by injection molding. In operation, the valve 10 can be moved from the closed condition shown in FIGS. 14, 16, and 17 to the open condition shown in FIG. 15 by a user applying pressure to the exterior of the web portions 86 and 88 of the pouch 82 to increase the pressure differential across the head 12 of the valve 10 to dispense fluid substance from the pouch 82 via the port 94 and valve 10.

While the dispensing packages 50 and 80 show the valve 10 being mounted to the respective closures via the planar portion 34C of the attachment portion 19, it should be understood that any portion 34A, 36A, 34B, 36B, 34C, and 36C of the attachment portion 19 can be joined to a corresponding surface of a fitment or other fluid system component to provide a suitable mounting for the valve 10. In this regard, if the portions 34B and/or 36B are so joined, the portions 34C and 36C can be eliminated if desired. Similarly, if the portions 34A and/or 36A are so joined, the portions 34B, 36B, 34C and 36C can be eliminated if desired.

FIGS. 18-25 show another embodiment of the valve 10 that is identical to the valve 10 of FIGS. 1-17 except for the number of slits 28 (two rather than three) and the peripheral attachment portion 19, which is provided in the form of a more ridged, cylindrical mount ring/seal than the relatively thin, planar shape used in the attachment portion 19 of the embodiment of FIGS. 1-17. In this regard, the peripheral attachment portion 19 of the embodiment of FIGS. 18-34 includes cylindrical portions 34B and 36B of exterior surface 34 and interior surface 36, respectively, which are spaced by a material thickness that is several times thicker than the material thickness T of the head 12 and sleeve 20. The portions 34B and 36B define a cylindrical wall 100 that surrounds the head 12 and the sleeve 20. Furthermore, the exterior and interior surfaces 34 and 36 of the attachment portion 19 define a radially outwardly extending seal/mount lip 102. In the regard, the exterior and interior surfaces 34 and 36 further include arcuate portions 34D and 36D, respectively, that extend laterally outwardly from the portions 34B and 36B, respectively, with the portion 34D extending to a frustoconical portion 34E, and the portion 36D extending to a planar portion 36E. The portions 34E and 36E extend to a cylindrical portion 104 that defines the radial outermost extent of the lip 102.

As seen in FIGS. 26-29, the embodiment of FIGS. 18-25 is assembled in the dispensing package 50, but the attachment portion 19 provides a different mount configuration than the attachment portion 19 of the embodiment of FIGS. 1-17. Specifically, the lip 102 provides a snap-fit engagement past radially inwardly extending, annular ribs 106 provided in a cylindrical spout 108 in the deck 60 of the closure 84, with the cylindrical portion 104 being in frictional, sealed engagement with an interior, cylindrical surface 110 of the spout 108.

As seen in FIGS. 30-34, the embodiment of FIGS. 18-25 is assembled in the dispensing package 80, but with the attachment portion 19 again providing a different mount configuration than the attachment portion 19 of the embodiment of FIGS. 1-17. Specifically, the lip 102 provides a snap-fit engagement past a radially inwardly extending, annular rib 112 provided in a cylindrical wall 113 of the fitment 92, with the cylindrical portion 104 being in frictional, sealed engagement with an interior, cylindrical surface 114 of the wall 113.

The head 12 and the sleeve 20 of the valve 10 of FIGS. 18-34 are preferably formed from a film of material that has undergone a permanent deformation to define at least the head 12 and the intermediate portion 20. In this regard, the film of material can be permanently deformed utilizing a suitable thermal forming technique, which includes matched die forming, vacuum forming, plug assist forming, vacuum snap back forming, billow forming, free forming, pressure forming, drape forming, in-line thermal forming, twin sheet forming, and thin and thick gauge thermal forming. Other suitable processes include cast film extrusion, cold forming, in-mold labeling technology, in-mold assembling technologies, blow molding in a die set against a preform, roto forming, rotary "chip shot" molding, radio frequency (RF) forming, localized laser heating, etching processes to warp the film into a valve shape, and UV (ultraviolet) curing of a formed valve. In a preferred process for the valve 10 of FIGS. 18-34, a preformed component is first made via injection molding of EVA or LDPE so that a film layer is surrounded by the cylindrical portions 34B, and then the shape of the valve head 12, sleeve 20, and portions 34A and 36A of the attachment portion 19 are formed using a suitable thermal forming process. In another preferred process, the entire valve 10 of FIGS. 18-34 is formed in its final shape by an injection molding of EVA or LDPE.

While the valves 10 have been shown herein in connection with specific embodiments of fluid dispensing systems for purposes of illustration, the valves 10 of the present invention may be used with a variety of conventional or special fluent substance handling and/or holding systems, including glass or plastic bottles, flexible tubular containment structures, containers, tanks, vessels, tubing, medical devices and other equipment or apparatus, the details of which, although not fully illustrated or described, would be apparent to those having skill in the art and an understanding of such systems. The particular fluent substance handling or holding system, per se, forms no part of, and therefore is not intended to limit, the broad aspects of the present invention. It will also be understood by those of ordinary skill that novel and non-obvious inventive aspects are embodied in the described exemplary valves 10 alone.

As previously discussed, the valves 10 are typically designed to close when the pressure differential across the valve head 12 drops below a predetermined amount. The inherent resiliency of the valve 10 allows the valve 10 to return to the unactuated, closed condition (by action of the force generated from the resilient valve's deformational stresses). Preferably, the valve 10 is sufficiently stiff so that it remains closed under the weight or static head of the substance in the container bearing against the interior surfaces 10 and 26, but the valve 10 is flexible enough to open when the valve head 12 is subjected to an increased pressure differential greater than a predetermined magnitude.

The valves 10 are also typically designed to be flexible enough for use in various applications where it is necessary or desirable to accommodate in-venting of ambient atmosphere. To this end, as the valve 10 closes, the closing petals or openable portions 30 can continue moving inwardly past the closed position to allow the valve petals 30 to open inwardly when the pressure on the valve head exterior surface 14 exceeds the pressure on the valve head interior surface 16 by a predetermined magnitude. Such in-venting of the ambient atmosphere helps equalize the interior pressure in the container with the pressure of the exterior ambient atmosphere. Such an in-venting capability can be provided by selecting an appropriate material for the valve construction, and by selecting appropriate thicknesses, shapes, and dimensions for various portions of the valve head 12 for the particular valve material and overall valve size. The shape, flexibility, and resilience of the valve head, and in particular, of the petals 30, can be designed or established so that the petals 30 will deflect inwardly when subjected to a sufficient pressure differential that acts across the head 12 in a gradient direction toward the valve interior side (second side 40). Such a pressure differential might occur after a quantity of a substance is discharged through the valve 10, and a partial vacuum is created on the inside of the valve 10. When the valve 10 closes, if there is a partial vacuum in the container, and if the pressure differential across the valve 10 is large enough, the valve petals 30 will deflect inwardly beyond the initial closed position/condition to an open configuration so as to permit in-venting of the ambient atmosphere into the container to assist in equalizing the internal pressure with the external pressure. As the external and internal pressures equalize, the inwardly displaced petals 30 will move back out to the initial, closed position/condition.

If it is desired to provide particular dispensing characteristics, then the dispensing valve 10 is preferably configured for use in conjunction with (1) the characteristics or shape of the particular supply reservoir (not shown—but which may establish the maximum height (i.e., static head) of the substance or product in the reservoir), (2) the characteristics of the particular substance or product, and (3) any relevant characteristics of the other dispensing system components. For example, the viscosity and density of the fluent substance product can be relevant factors in designing the specific configuration of the valve 10. The rigidity and durometer of the valve material, and size and shape of the valve head 12, can also be relevant to achieving some desired dispensing characteristics, and can be selected for accommodating the normal range of pressure differential that is expected to be typically applied across the valve head, and for accommodating the characteristics of the substance to be dispensed therefrom.

It should be understood that while specific embodiments of the valve 10 have been shown and described herein, there are many variations that may be desirable for the valve depending upon the particular requirements. For example, while the head 12 and the sleeve 20 have been shown as having the uniform material thickness T, in some applications it may be desirable for the material thickness to vary from the head 12 to the sleeve 20, or to vary within the head 12 and/or the sleeve 20. By way of further example, while a number of surfaces have been described herein as having a specific shape (concave, convex, frustoconical, planar, etc) other specific shapes may be desirable for those surfaces depending upon the particular application.

It will be readily observed from the foregoing detailed description of the invention and from the illustrations thereof that numerous other variations and modifications may be effected without departing from the true spirit and scope of the novel concepts or principles of this invention.

It should be appreciated that by forming all or part of the valves 10 by permanently deforming a film of material, the valves 10 can be produced at a reduced cost and/or weight in comparison to conventional slit valves that are molded and require a greater material thickness in at least the head of the valve, such as the valve described in the Background Of The Invention section of this disclosure.

The invention claimed is:

1. A slit valve (10) to selectively restrict the passage of a fluent substance between an interior environment (17) and an exterior environment (15), the valve (10) comprising:
    a flexible, resilient head (12) centered on a central axis (27) and extending laterally therefrom, the head (12) having:
    an interior surface (16) to face an interior environment (17), the interior surface (16) having one of a concave or convex shape,
    an exterior surface (14) to face an exterior environment (15), the exterior surface (14) having the other of a concave or convex shape, and
    confronting, openable portions (30) to define a normally closed orifice in an unconstrained condition wherein the openable portions (30) can move in a first direction to an open orifice configuration and return in an opposite direction to a closed configuration;
    an annular, peripheral attachment portion (19) spaced laterally from the head (12); and
    an annular, flexible, resilient, intermediate portion (20) extending laterally from the head (12) to the peripheral attachment portion (19), the intermediate portion (20) having:
    an interior surface (26) to face said interior environment (17), and
    an exterior surface (24) to face said exterior environment (15);
    wherein the head (12) and the intermediate portion (20) have a uniform material thickness T spacing the exterior surfaces (14, 24) from the interior surfaces (16, 26), with T being no greater than 0.020 inch; and
    wherein the head (12) and the intermediate portion (20) are formed from a film of material that has undergone a permanent deformation to define the head (12) and the intermediate portion (20).

2. The valve (10) of claim 1 wherein the head (12) has at least one self-sealing slit (28) through the head (12), and the confronting openable portions (30) extend along the at least one self-sealing slit (28).

3. The valve (10) of claim 1 wherein the interior surface (16) of the head is a convex surface and the exterior surface (14) of the head is a concave surface.

4. The valve (10) of claim 1 wherein the uniform material thickness T is in the range of 0.004 to 0.013 inches.

5. The valve (10) of claim 1 wherein the attachment portion (19) has a planar interior surface (36) spaced from a planar exterior surface (34) by the uniform material thickness T.

6. The valve (10) of claim 1 wherein the attachment portion (19) has an interior surface (36) spaced from an exterior surface (34) by a non-uniform material thickness that varies over the annular extent of the attachment portion (19).

7. The valve (10) of claim 6 wherein the exterior surface (34) of the attachment portion (19) defines a cylindrical wall (100) that surrounds the head (12) and the intermediate portion (20).

8. The valve (10) of claim 6 wherein the interior surface (36) and the exterior surface (34) of the attachment portion (19) define a radially outwardly extending annular lip (102).

9. The valve (10) of claim 1 wherein the entire valve (10) is defined by a permanently deformed film of material.

10. The valve (10) of claim 1 in combination with:
a fluent substance container (52) having an opening (69) through which fluent substance can pass between an interior of the container (52) and the exterior environment (15); and a fitment (54) sealingly mounted to the container (52), with the valve (10) located in the fitment (54) to extend across the opening to restrict passage of a fluent substance between the interior of the container (52) and the exterior environment (15) at least when the openable portions (30) are in the closed configuration.

11. The valve (10) of claim 10 wherein the valve (10) is joined to the fitment (54).

12. The valve (10) of claim 1 wherein the head (12), peripheral attachment portion (19), and intermediate portion (20) are all symmetrical bodies of revolution centered on the central axis (27).

13. A method for forming a slit valve (10) to selectively restrict the passage of a fluent substance between an interior environment (17) and an exterior environment (15), the method comprising the steps of:
providing at least one layer of film material; and
permanently deforming the film material to define a valve (10) for selectively restricting the passage of a fluent substance between an interior environment (17) and an exterior environment (15).

14. The method of claim 13 wherein the step of permanently deforming the film material comprises permanently deforming the film material to define a valve (10) having
a flexible, resilient head (12) centered on a central axis and extending laterally therefrom, the head (12) having:
an interior surface (16) to face an interior environment (17), the interior surface (16) having one of a concave or convex shape, and
an exterior surface (14) to face an exterior environment (15), the exterior surface (14) having the other of a concave or convex shape;
an annular, peripheral attachment portion (19) spaced laterally from the head (12); and
an annular, flexible, resilient, intermediate portion (20) extending laterally from the head (12) to the peripheral attachment portion (19), the intermediate portion (20) having:
an interior surface (26) to face said interior environment (17), and
an exterior surface (24) to face said exterior environment (15).

15. The method of claim 14 wherein the step of permanently deforming provides the head (12) and intermediate portion (20) with a uniform material thickness T spacing the exterior surfaces (14, 24) from the interior surfaces (16, 26), with T being no greater than 0.020 inch.

16. The method of claim 15 wherein the step of permanently deforming further comprises defining the annular attachment portion (19) to have the uniform material thickness T.

17. The method of claim 16 wherein the step of permanently deforming further comprises defining the annular attachment portion (19) to have a planar exterior surface (34) and a planar interior surface (36).

18. The method of claim 15 wherein the uniform material thickness T is in the range of 0.004 to 0.013 inches.

19. The method of claim 14 further comprising the step of forming at least one self-sealing slit (28) in the head (12) and confronting, openable portions (30) along the at least one slit (28) in the head (12) to define a normally closed orifice in an unconstrained condition wherein the openable portions (30) can move in a first direction to an open orifice configuration and return in an opposite direction to a closed configuration.

20. The method of claim 13 wherein the step of providing at least one layer of film material comprises providing a plurality of layers of film material and the step of permanently deforming comprises permanently deforming the plurality of layers to define the valve (10).

21. The method of claim 13 wherein the step of permanently deforming comprises thermoforming the at least one layer of film to define the valve (10).

22. The method of claim 21 wherein the step of thermoforming comprises matched die forming to define the valve (10).

23. The method of claim 13 wherein the step of providing the at least one layer of film comprises injection molding a preformed component having the annular attachment portion (19) and the at least one layer of film extending radially inwardly from the annular attachment portion (19).

24. The method of claim 14 wherein the head (12), peripheral attachment portion (19), and intermediate portion (20) are all symmetrical bodies of revolution centered on the central axis.

* * * * *